United States Patent [19]
Klementich

[11] Patent Number: 5,360,239
[45] Date of Patent: Nov. 1, 1994

US005360239A

[54] THREADED TUBULAR CONNECTION

[75] Inventor: Erich F. Klementich, Houston, Tex.

[73] Assignee: Antares Marketing, S.A., Fribourg, Switzerland

[21] Appl. No.: 873,341

[22] Filed: Apr. 20, 1992

Related U.S. Application Data

[63] Continuation of Ser. No. 386,740, Jul. 28, 1989, abandoned.

[51] Int. Cl.$^5$ ............................................. F16L 25/00
[52] U.S. Cl. ..................................... 285/94; 285/328; 285/334; 285/422
[58] Field of Search ............... 285/333, 334, 355, 390, 285/94, 328, 422

[56] References Cited

U.S. PATENT DOCUMENTS

| | | | |
|---|---|---|---|
| 2,177,100 | 10/1939 | Frame | 285/334 |
| 4,384,737 | 5/1983 | Reusser | 285/334 |
| 4,582,348 | 4/1986 | Dearden et al. | 285/390 X |
| 4,629,223 | 12/1986 | Dearden et al. | 285/390 X |
| 4,707,001 | 11/1987 | Johnson | 285/355 X |

*Primary Examiner*—Dave W. Arola
*Attorney, Agent, or Firm*—Pollock, Vande Sande & Priddy

[57] ABSTRACT

Threaded tubular interference fit interconnections and related production techniques are disclosed that are for example useful with large diameter tubular members, including pipe bodies, that can for example function as casing for oil, gas, geothermal, disposal and other wells. In a preferred aspect of the invention there is root-to-crest and/or flank-to-flank interference between nose and inner portions of male and female threads of the disclosed interconnections, such as substantially to seal them against leakage at the maximum internal and/or external pressure rating of the pipe body, and a run-out portion of the male thread and a corresponding portion of the female thread engage one another with interference to retain threaded engagement between said run-out and corresponding portions at the maximum axial force rating of the pipe body and also at the maximum internal and/or external pressure rating of the pipe body. These connections, when applied to API line pipe or other tubular products, can allow them to properly function as large diameter casing exhibiting easy and economical manufacture with existing machinery, easy installation in the field, good balance between geometric and load capacity transparency, and freedom from some undesirable characteristics of prior products.

77 Claims, 15 Drawing Sheets

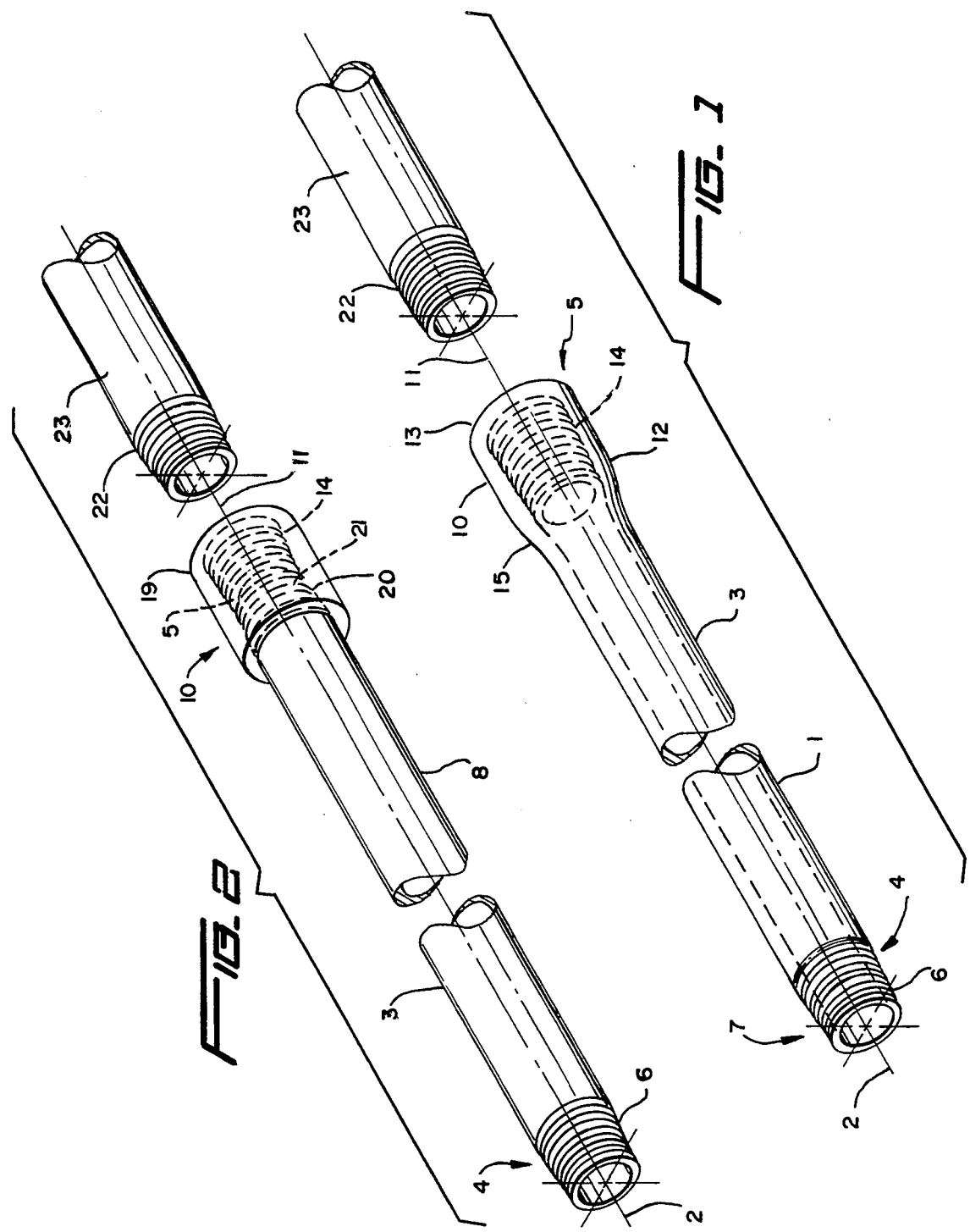

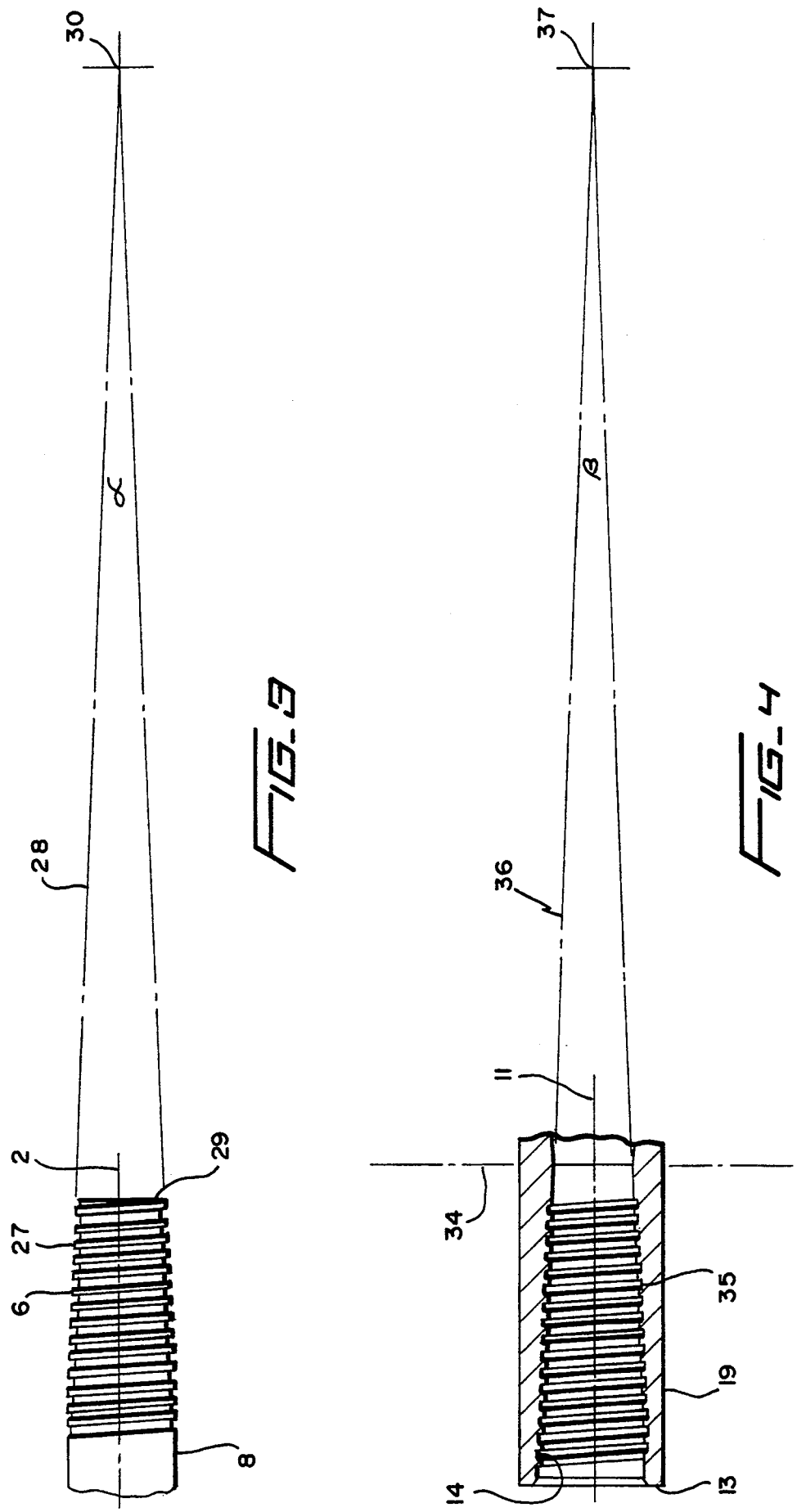

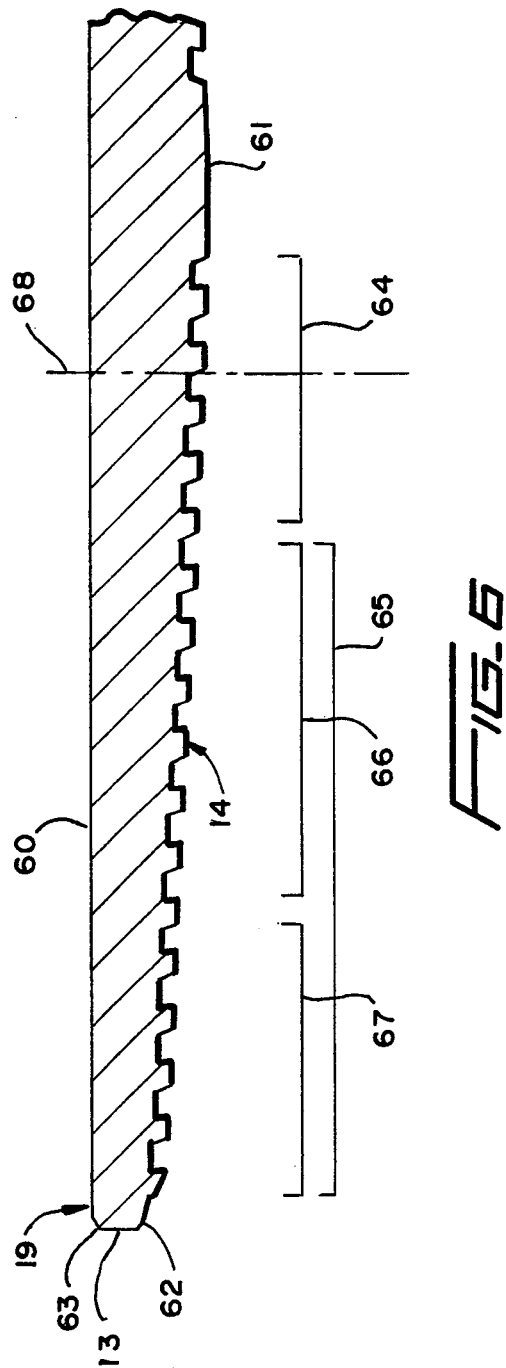
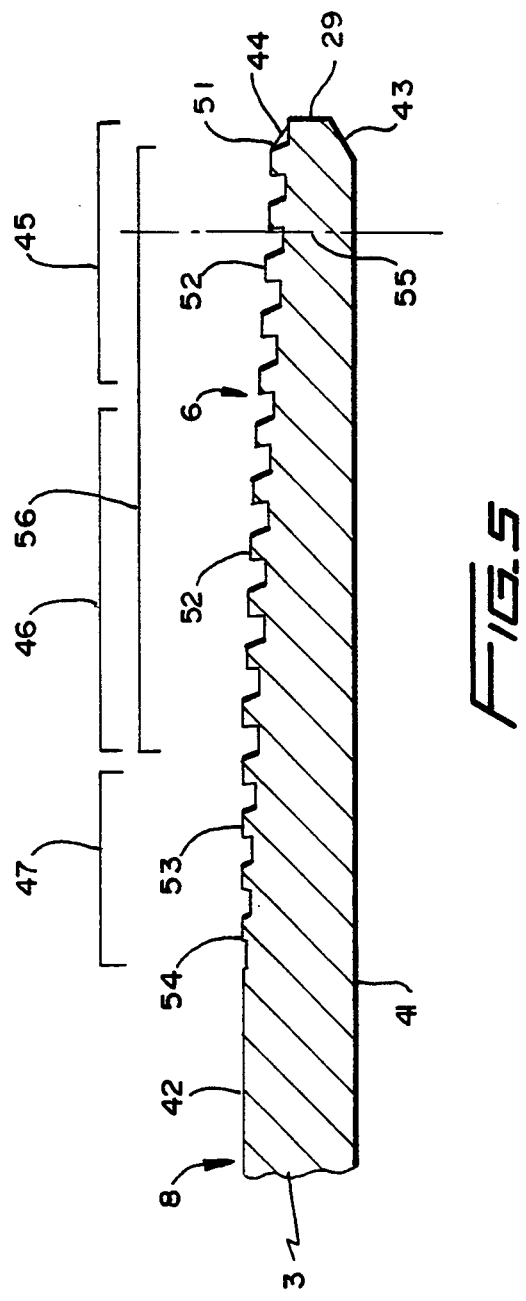

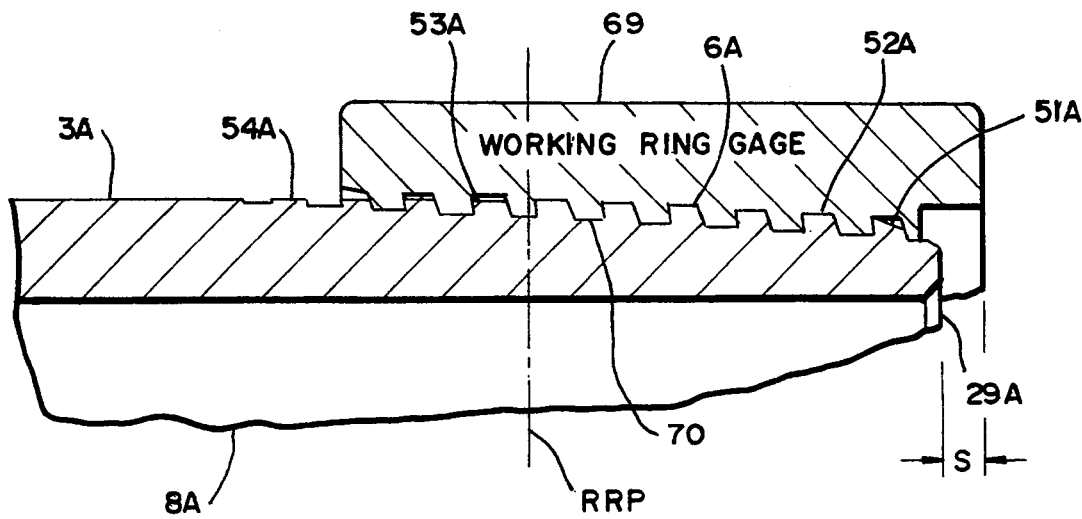
FIG_7A
PRIOR ART
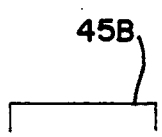
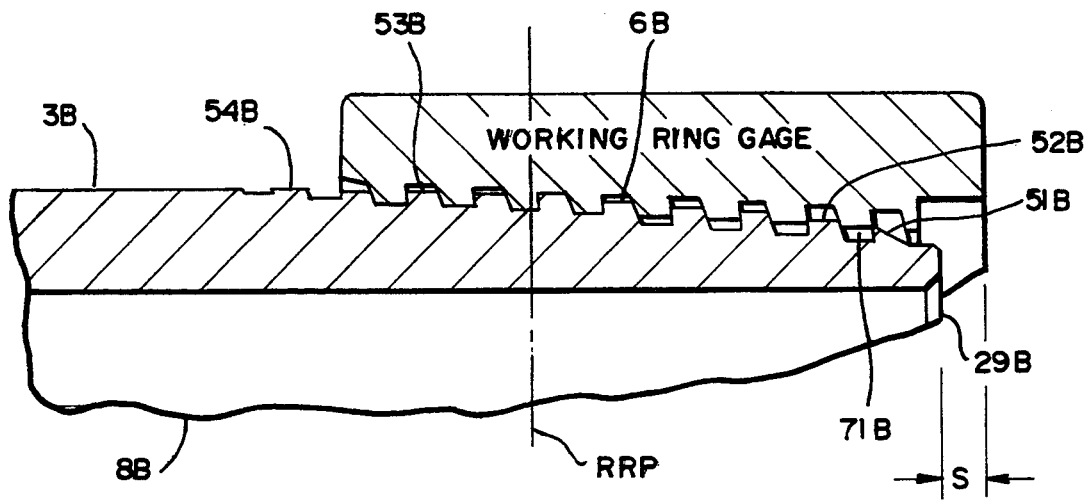
FIG_7B
PRIOR ART

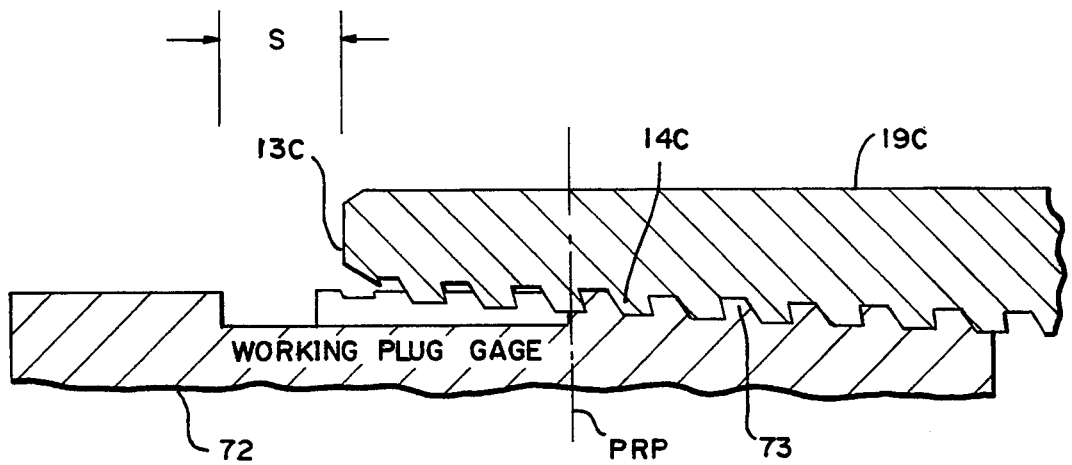
FIG_7C
PRIOR ART
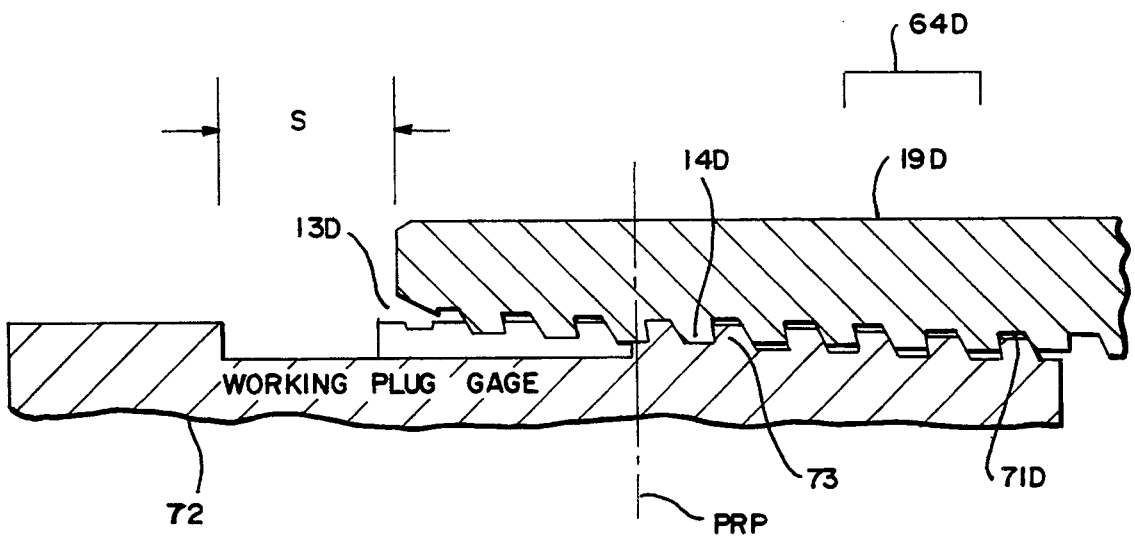
FIG_7D
PRIOR ART

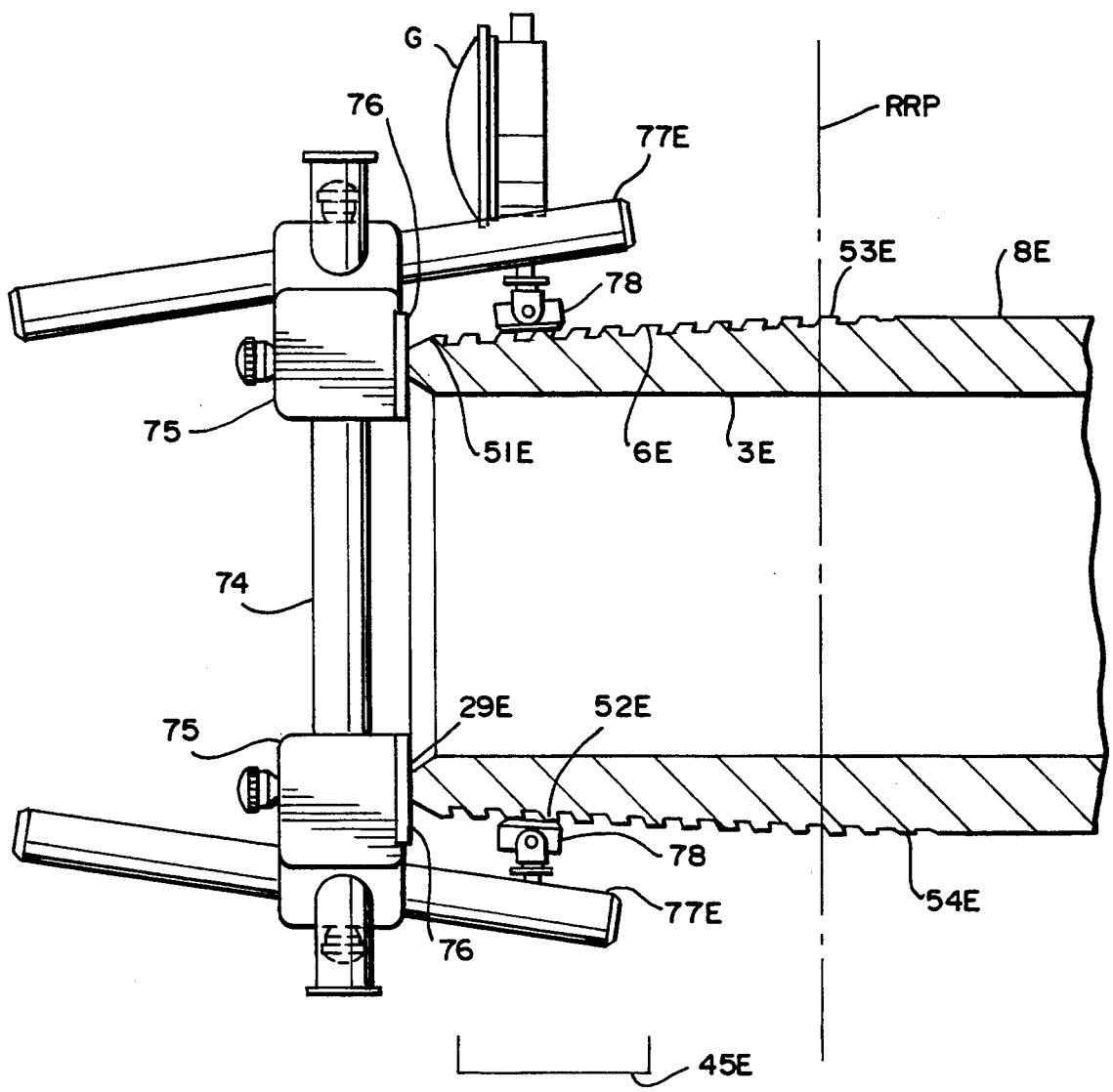

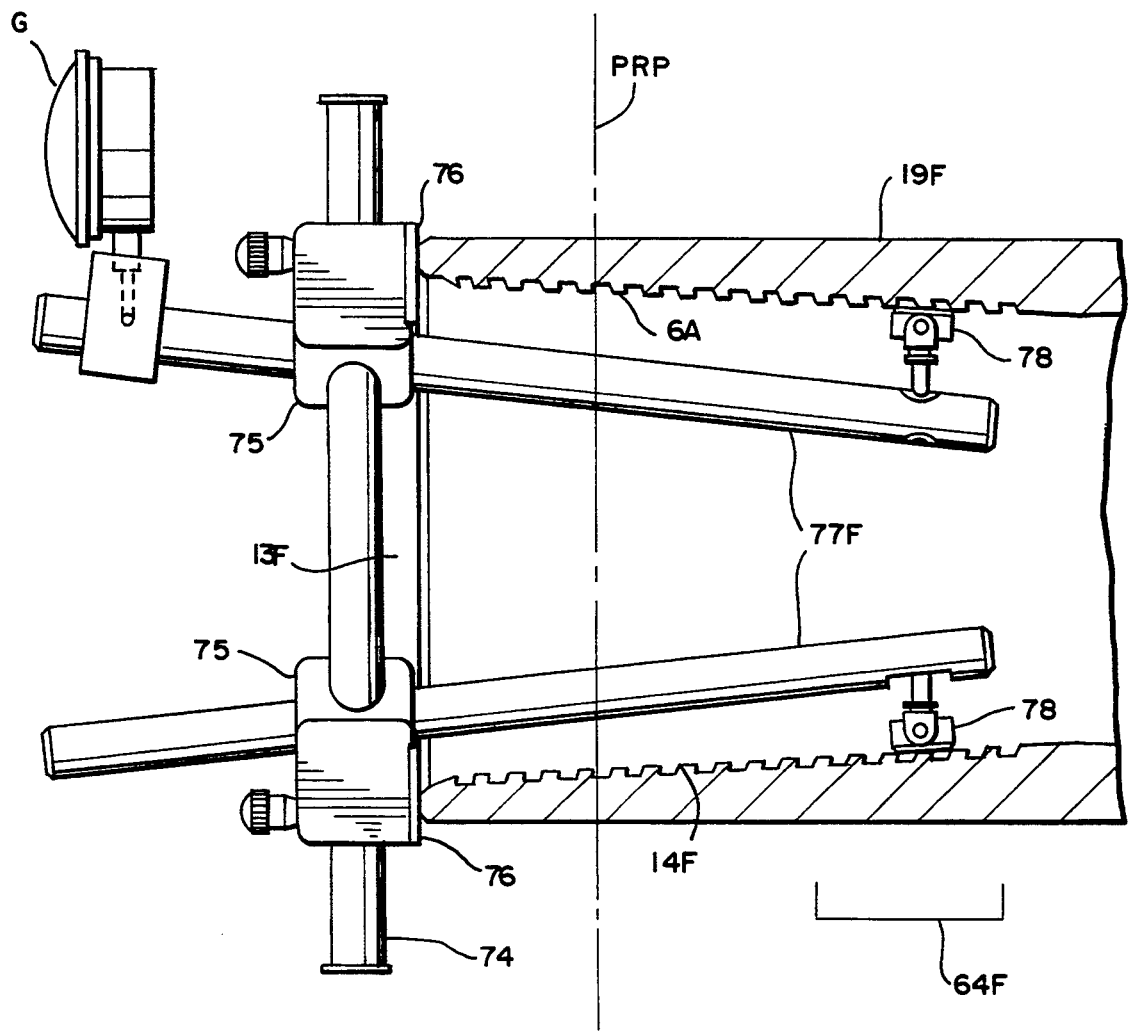
FIG_7F

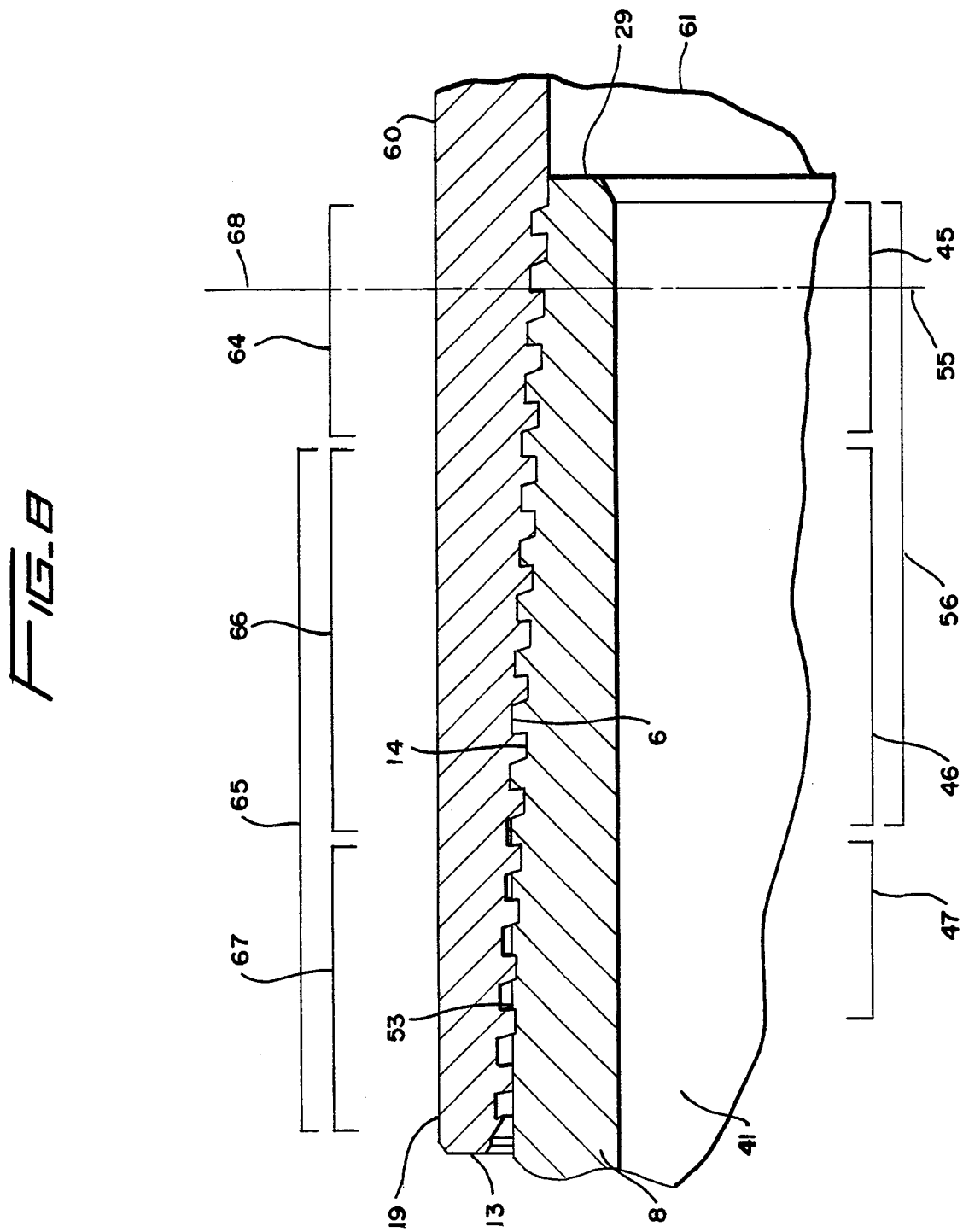

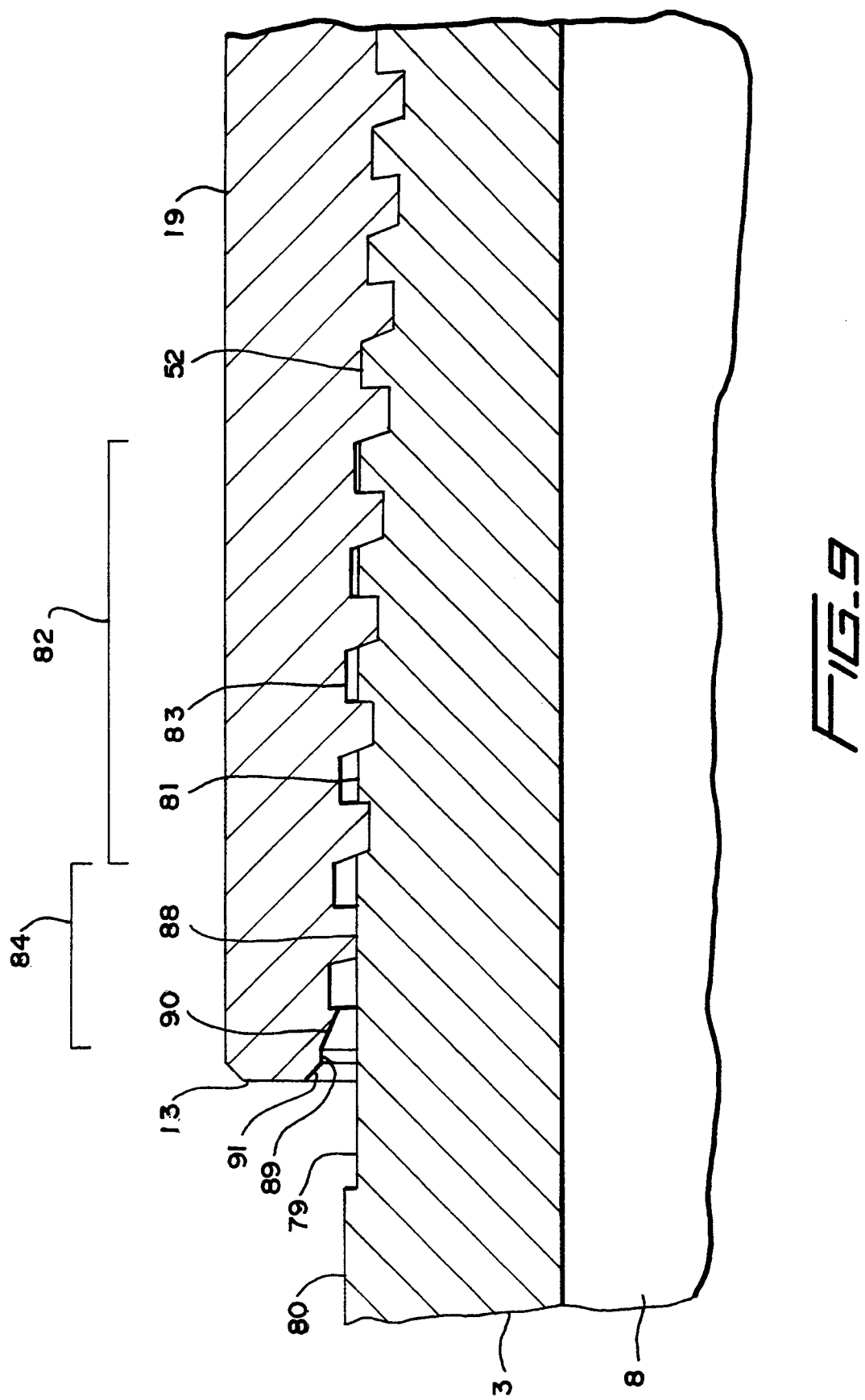

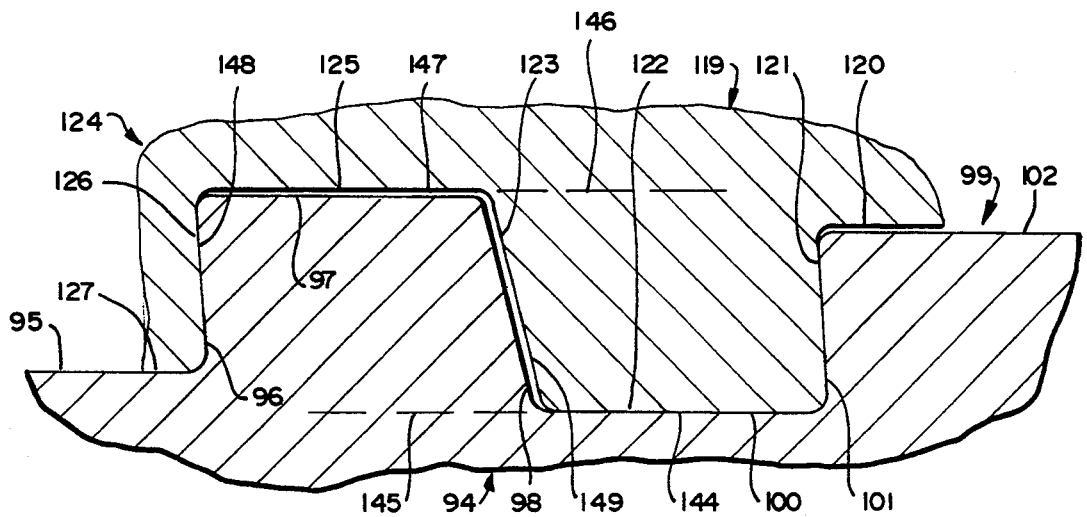
FIG_12A
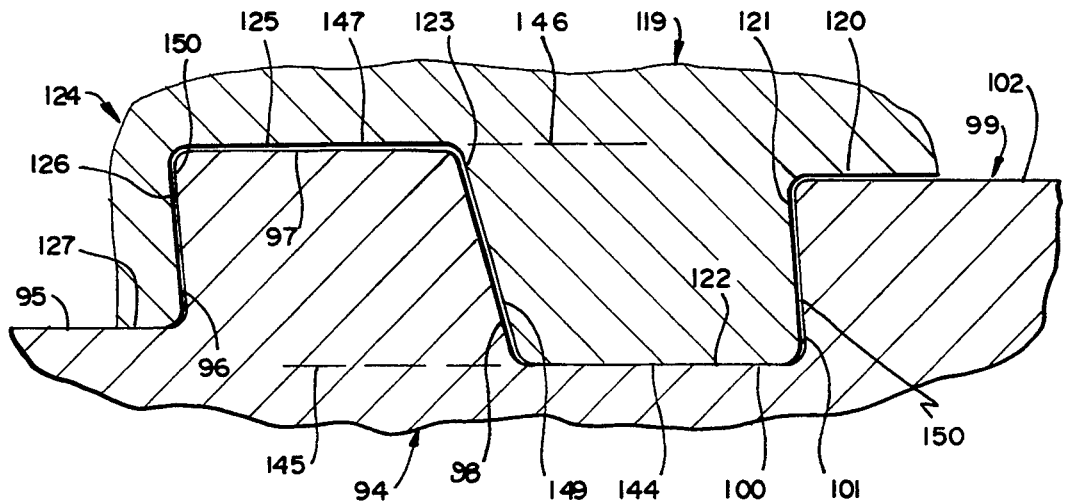
FIG_12B

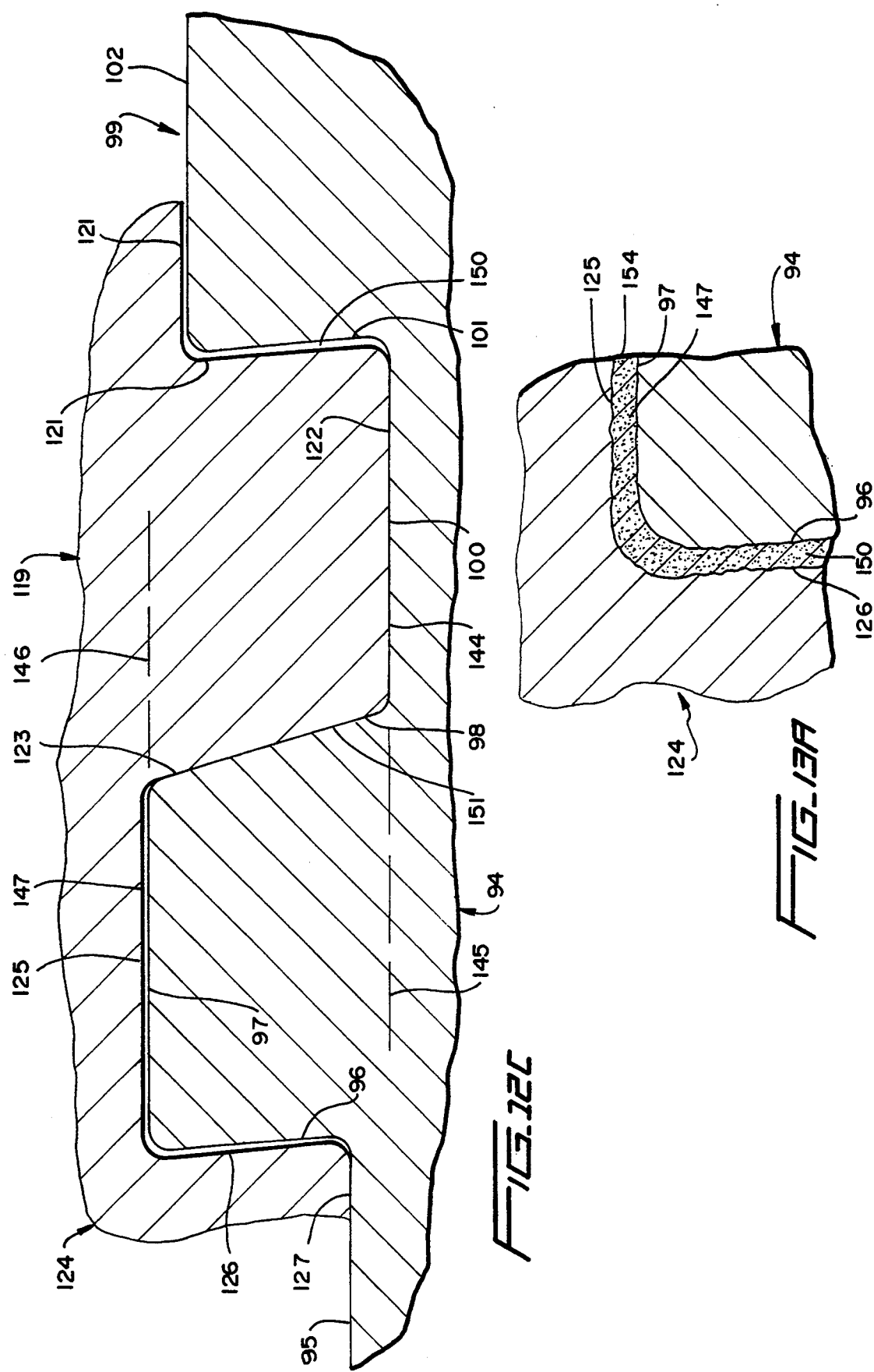

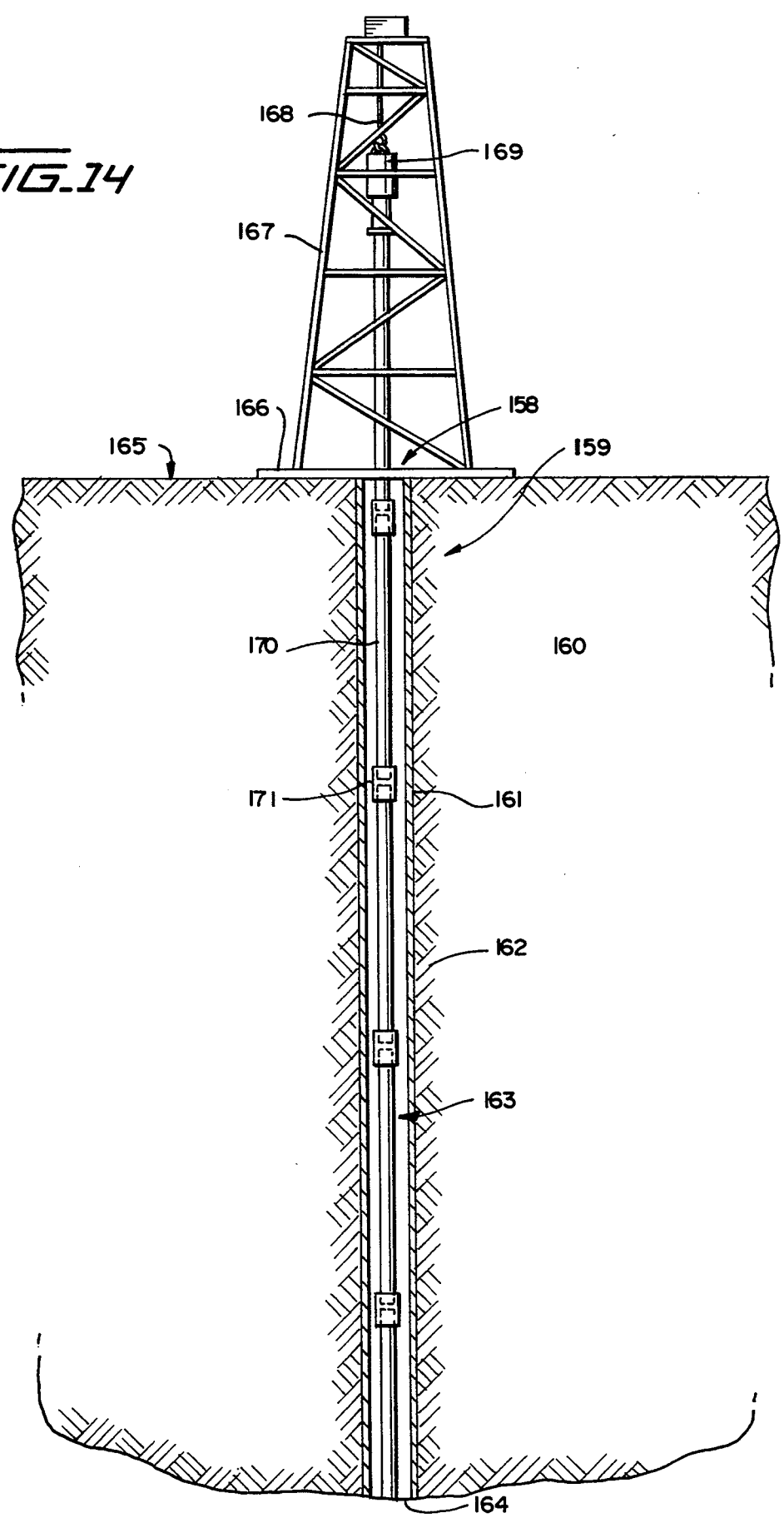

THREADED TUBULAR CONNECTION

This is a continuation, of application Ser. No. 07/386,740, filed Jul. 28, 1989, and now abandoned.

FIELD OF INVENTION

This invention pertains to threaded tubular connections. More particularly the invention relates to tapered threaded connections for large diameter pipe, specifically the application of such a threaded connection to line pipe or other tubular products, such that it may function as casing for use in oil, gas, geothermal, disposal and other types of wells.

BACKGROUND OF THE INVENTION

The continuing demand for energy has promoted the search for oil and gas at deeper horizons and in more hostile environments. Both circumstances require the use of more casing strings (steel pipes) in a given well than in past wells. Since the required size of the production casing and tubing string is relatively fixed, large diameter casing, set at increasing deeper depths, is invariably required in deep or hostile environment wells. Similarly, the concern for environmental pollution has promoted the development of relatively clean geothermal energy sources. Those wells also require the use of relatively large diameter casing strings. Furthermore, cleanup of existing pollution and increasing bans against surface dumping have fostered a new industry and technology relating to disposal and neutralizing wells. These wells also generally require large diameter casing set at relatively deep depths.

The performance of a pipe string for an oil, gas, geothermal or disposal well is, in part, measured by its ability to carry any one or any combination of the five primary forces which can be placed on a pipe string, namely 1) pressure, which may be internal and/or external, 2) axial force, which may be applied in tension and/or compression, 3) bending, 4) torsion and 5) lateral (side) loads. Thus, in designing a pipe string for a given application, the weight (wall thickness) and steel strength level (grade) of the pipe for the specific size (outside diameter) in question are selected with reference to the magnitudes of the foregoing forces that are expected to be exerted on the string.

The pipe string itself is composed of many sections of pipe fastened together at the well site by one of several available means. Some of these involve welding the pipe sectionals together as they are installed in the well. Others involve mechanical casing connections, including threaded or collet type connections. A key factor governing the success of large diameter casing designs is the ease and surety with which connections can be made between individual lengths in the field. Welding is slow and cumbersome. Consequently, for well casing service mechanical connectors are often employed. Due to the weight of the pipe itself, large diameter mechanical casing connections must be damage-resistant and possess good stabbing characteristics. This means that at the start of make-up they should be relatively insensitive to the relative positions of the members bearing the male and female connector parts, and that they should be capable of reliably achieving the required made up state. For proper make-up, collet connectors should achieve a positive lock-up, and threaded connectors should be quite resistant to cross-threading. Therefore, the performance of the connector is a dominant factor in the performance of the entire pipe string. A sound pipe string in the well cannot be achieved without sound connections.

The performance requirements of large diameter threaded connectors on large diameter casing strings are essentially the same as those for smaller size casing connections; yet it is far more difficult to satisfy these requirements in the larger sizes. The ideal tubular connector would be completely transparent in both load capacity and geometry, meaning that the pipe string would behave in all respects as if it were a single continuous length of pipe with no connections in it.

Welding comes close to achieving this goal. However, except for shallow strings set in high clearance holes and for drive pipe, welding the pipe sections together end-to-end is not practical since the actual welding and the inspection process is very time consuming and the pipe string would likely become stuck in the hole before the setting depth is reached. Some form of mechanical connector is therefore required.

Unfortunately, the ideal transparent mechanical connector has not been realized to date. Essentially transparent load capacity has been achieved with threads machined on hot forged upsets at the ends of the pipes. However, this has been accomplished at the expense of string geometry, i.e. the resultant connections are very bulky. Conversely, transparent geometry has been achieved with flush joints made within the confines of the pipe bodies, but only with substantial degradation of load capacity.

A good compromise between transparent geometry and transparent load capacity can be obtained with threaded and coupled (T&C) connections. In fact, this configuration is utilized by two of the three standard industry connections, American Petroleum Institute (API) 8R (LTC and STC) and BTC connections. Unfortunately, in such relatively large casing sizes as 16 to 20 inches in outside diameter, these API standard connections have serious deficiencies limiting their use to relative shallow depths and benign environments. The chief deficiencies with the 8R thread for large diameter pipe are extreme difficulty of achieving a proper makeup and very poor axial load capacity. Although API BTC is easier to make up than API 8R, it is subject to cross threading and lacks adequate pressure integrity.

To overcome the deficiencies of the industry standard API connections, various proprietary tubular connections have been developed that at least partially embody the above-described compromise, but are based on divergent design philosophies. For example, the proponents of one school of thought have been influenced by the perception that it is not generally practical to hot forge the ends of large diameter pipes and then machine integral connections on them. The pipe upsetters used to make such forgings on smaller pipes are usually restricted to outside pipe diameters of 10¾ inches or less. Therefore, this school has pursued proprietary connectors machined on separate forgings which are then welded to the pipe body. This resulted in massive connectors that were very robust. Both threaded and collet type connecting mechanisms of this type have been made available. However, a major problem with weld-on connectors is the difficulty of preventing misalignment between the pipe body and the forged, weld-on connector. Moreover, although near transparent load capacities can be achieved with this type of connection, it is only achievable at substantial expense to geometric transparency and at very high costs.

A different design school has concentrated on developing highly intricate and complex integral joint threads machined on plain-end pipe or plain-end pipe with cold formed ends. Although these proprietary thread forms have, or can achieve, near transparent geometry, their load capacity is deficient. Chiefly, the pressure and axial load capacity is substantially less than that of the pipe body. Also, virtually all of these connections have little if any bending resistance. Consequently, these joints are not suitable for use in directional (purposely deviated) wells, or where large diameter pipe strings must be set at deep depths.

Thus, it is believed that the proprietary connections developed according to these differing schools of thought do not provide an acceptable balance between load capacity, geometric transparency and ease of installation at a reasonable cost.

Another serious problem in the art relating to large diameter casing is that relatively few permutations, i.e. different weights and grades in a given size, exist in the industry standard API casing list. Because many well operators are required to use only API standard casing, well designers are often forced to choose between specific forms of casing that are either marginally adequate in load capacity or overly strong. Seldom is a specific large diameter casing product available that is exactly what is needed. For example, in the API large diameter casing sizes from 16 to 20 inches, there are only nineteen items with a unique combination of size (O.D.), weight (wall thickness), and grade (steel strength level) from which the well designer can choose. Moreover, even the strongest items do not have an adequate load capacity for the large diameter casing strings set at the deeper depths currently required in some wells. Therefore, there is a clear need to broaden the range of products available.

Some manufacturers have recognized the deficiencies of the standard API product and have developed remedies, even including additional available weights and grades in a threaded and coupled (T & C) configuration. However, it does not appear that any of them have developed a complete optimum solution. Because of specific limitations in their manufacturing processes, those "trans API" casing products now commercially available in permutations offering alternatives to API casing in terms of size, weight and grade, unfortunately fail to meet the rather crucial outside diameter and drift (internal free passage) diameter requirements of the API casing specifications. Furthermore, the dimensions of the raw coupling (female joining component prior to threading) does not conform with API requirements. These factors adversely affect performance and increase the cost of the product to the user.

Fortunately, in the diameter range of 16 to 20 inches, there are now about 300 different forms of API Line Pipe products. They include unique combinations of size, weight and grade, have specifications documented in the form of industry standards, and are thus potentially useful as large diameter casing. Moreover, the API Line Pipe specifications (SPEC 5L) extend to a grade 45 percent stronger than what is available in the API large diameter casing specification (Spec 5CT). Unfortunately, although API Spec 5L details a threaded line pipe connection in the sizes of 16 to 20 inches outside diameter, it is only standardized for the lightest weight pipe, which is not useful for casing service. Moreover, this connection is inherently unsuitable for downhole casing service.

There is therefore a need for a connector that can be applied to API line pipe or other tubular products which will allow it to properly function as large diameter casing. Such a connector should achieve a good balance between geometric and load capacity transparency, be easily installable in the field, and not possess any of the undesirable characteristics of the previously described prior products. Furthermore, this connector should be manufacturable with existing machinery at a realistic cost. The object of this invention is to provide a connector having some portion and preferably all of the foregoing advantages.

SUMMARY OF THE INVENTION

The present invention has a number of facets which contribute to fulfillment of the above-described needs. These various aspects, to be described below, may be employed alone or in combination to provide various gradations of improvement over existing technology.

A first aspect of the invention provides, in combination, a length of threaded pipe comprising a pipe body, a male thread with a run-out portion and regular turns having load flank, stab flank, crest and root, and a female member with female thread to enable coupling of said pipe to a further length of threaded pipe. In this combination, the male thread is tapered over at least a portion of its axial length, including a nose portion thereof. The female thread is also tapered over at least a portion of its axial length, including an inner portion thereof which threadably engages with the nose portion of the male thread when said threads are in made-up position. Moreover, the male and female threads have load flank angles and thread heights sufficient to ensure that with the threads in made-up position at least the load flank of the male thread will remain engaged with the load flank of the female thread even in response to an axial load substantially corresponding to the axial yield strength of the pipe. Also, the male and female threads are so dimensioned in relation to each other at said nose and inner portions to ensure that in made-up position a root-to-crest and/or flank-to-flank interference fit will exist between said nose and inner portions that is sufficiently large to substantially prevent leakage at the maximum internal and/or external pressure rating of said pipe body and/or coupling member. Additionally, the male and female threads are so dimensioned in relation to each other that in made-up position the run-out portion of the male thread and a corresponding portion of the female thread will engage each other in an interference fit with interference that is sufficient to retain threaded engagement between the run-out and corresponding portions at the maximum axial force rating of the pipe body and also at the maximum rated internal and/or external pressure rating of the pipe body. But such interference is less than that which will cause either substantial destructive hoop stress yield deformation of said pipe or female member or substantial destructive galling of said male or female threads.

For purposes of the present invention, in a male thread of plural thread turns applied to the end of a pipe, the nose portion is usually that portion of the turns nearest the end of the pipe. In a pipe having a number of regular thread turns (the height of which may vary), with or without run-out thread turns, the nose portion is defined as about half or less of such regular turns, and particularly that half nearest the end of the pipe. In a tapered male thread, the nose portion will thus encompass the threads at the smaller diameter end of the taper. The inner portion of the female thread is that group of its turns which engages the male thread nose portion with the threads in made-up position.

The made-up position of male and female threads is their spatial relationship between them when they have been fully and properly tightened. The determination of the proper tightness for a given connection is a matter within the competence of persons skilled in the art. However, for many pipes, detailed tightening procedures are specified by the pipe manufacturers or industry groups. In such cases, full tightening may be signified by markings on the pipe showing the extent the male thread has become buried in the female thread, and in other cases proper tightening may be indicated by the amount of torque applied in tightening the threads.

In threads, interference is an excess of size in some dimension of the male thread, relative to the mating part of the female thread, which usually makes it necessary for the parts bearing the male and female threads to respectively contract and expand during tightening of the joint. Interference may take place at thread crests and roots, at either or both of the two types of flanks or at any combination of the foregoing. Certain preferred embodiments of the invention include radial interference, which exerts components of force on the mating parts in radial directions. This in turn generally causes the parts bearing the male and female threads to respectively contract and expand radially during tightening of the joint. Such radial expansion and contraction are accompanied, according to Poisson's law, by opposite effects on the same parts in the axial or lengthwise direction. Thus, radial interference causes lengthening of the part bearing the male thread and shortening of the part bearing the female thread. Interference has been used in pipe threads for many years, but its use in the present combination is believed to be unique.

In connection with the various aspects of the invention, it should be noted that pipes used in oil-field practice and other technologies are often rated by industry-recognized organizations with respect to one or more of their properties, such as the axial force and pressure ratings referred to above. For example the API (American Petroleum Institute) has established such ratings for oil well casing. The methodology, measurements and equations utilized in establishing such ratings have been published and are understood by those skilled in the art. Thus, it should be understood that the invention is not limited to pipes which have previously been rated by such an organization, and that it may in general be applied to any pipe for which the appropriate ratings may be calculated.

According to a particularly preferred embodiment of the first aspect of the invention as above described, the male and female threads are dimensioned in relation to each other, in both thread profile and diameter, to provide a root to crest or flank to flank gap between them and to ensure that a root to crest or flank to flank interference fit will exist between them in made-up position. Such interference is sufficiently large and the gap is sufficiently small, in the nose portion of the male thread, to substantially prevent leakage at the maximum internal and/or external pressure rating of the pipe body, and, in the run-out portion of the male thread, to retain threaded engagement with the female thread at the maximum axial force rating and maximum internal and/or external pressure rating of the pipe body. But the interference is insufficient to cause either substantial destructive hoop stress yield deformation of the pipe or female member or substantial destructive galling of either of the threads.

A second aspect of the invention involves the combination of a length of threaded pipe comprising a pipe body with male thread turns having load flanks, stab flanks, crests and roots and a female threaded member for coupling of said pipe to a further length of threaded pipe. This combination comprises male thread having a hook profile and being tapered over at least a nose portion of its axial length. Also, the female thread has a hook profile matingly compatible with the male thread profile and is tapered over an inner portion of its axial length which will threadably engage with the nose portion of said male thread in made up position. At least one of these threads has its surface roughened to assist in retention of a thread compound in place at the surface thereof. Moreover, the male and female threads are so dimensioned in relation to each other to provide a root to crest or flank to flank gap between them and to ensure that a root to crest or flank to flank interference fit will exist between them in made up position. This interference is sufficiently large and the gap is sufficiently small to substantially prevent, with the aid of thread compound therein and without substantial destructive galling of the threads, leakage through the nose and inner portions of the threads at the maximum internal and/or external pressure rating of the pipe body and at the maximum axial force capacity rating of the pipe body.

In hook threads, their load flanks are so shaped that they draw the threads together in a radial direction when said flanks are loaded. For example, in the male member, a substantial portion, the majority or substantially all of the load flank profile, viewed in a cross-section which includes the longitudinal central axis about which the thread is formed, leans away from the direction in which the male thread advances when tightened. The surface roughening utilized as an "anchor" pattern for thread compound may be accomplished in any suitable manner, such as in the formation of the thread or by redistribution, application or removal of material at the thread surface. Preferably both threads are roughened such as by blasting one with grit and applying rough-surfaced anti-galling coating to the other. Galling refers to cold-welding of minute patches of the frictionally and mutually engaged surfaces of male and female threads as they are screwed together, as a result of which a portion of the surface of one thread is torn from the surface of that thread and becomes a protuberance secured on the surface of the other thread. As the threads continue in relative rotation, this protuberance on the second thread acts as an irregular gouging or cutting "tool" which further damages the surface of the first thread and impairs the sealing ability of the second. Substantial destructive galling is that which results in a substantial reduction in the ability of a thread to hold pressure, for example the pressure for which it was designed, either when first assembled, or upon disassembly and attempted reuse.

The foregoing aspect of the invention defines a combination that heretofore was thought impossible to attain, and thus runs directly counter to teachings of the prior art. Previously, respected opinion has held that it was impossible to provide in the threads of a threaded connection, formed in large diameter pipe, both a seal of high pressure integrity and high mechanical strength, without substantial destructive galling during make-up and without reliance on unthreaded metal to metal or other seals in the connection.

A third facet of the invention involves a new combination of thread taper and interference which is useful in providing leak-resistant joints. In this combination, there is a pipe with male thread and an integral or non-integral female member with female thread for coupling said pipe with other similarly threaded pipes. However, the combination further comprises said pipe having root, crest, load flank and stab flank forming the male thread on an end of the pipe, said male thread having a nose portion which includes that portion of the male thread that is nearest the terminal portion of the pipe and in which the thread is tapered along its axial length to form thereby an included first apex angle of taper. There is also a female member having root, crest, load flank and stab flank forming the female thread for making a threaded connection through matingly compatible engaged portions of said female thread and the male thread of another such pipe. This female thread includes an inner portion for threadably engaging the nose portion of the male thread in the threaded connection when fully made up, the inner portion also being tapered along its axial length to form an included second apex angle of taper which is greater than the first angle. Moreover, the male and female threads are dimensioned in relation to each other, in both thread profile and diameter, to provide a root to crest radial gap between them at the major diameter of the male thread and to ensure that a root to crest interference fit will exist between them at the minor diameter of the male thread in made-up position. Such interference is sufficiently large and said gap is sufficiently small, in the nose portion of the male thread, to substantially prevent leakage at the maximum internal and/or external pressure rating of the pipe body.

The foregoing is a divergent taper, nose-interference, thread-sealing pipe. It is useful in pipe joints intended to attain in-thread seals against leakage of high pressure gaseous or liquid fluid from within pipe strings by effecting pressure seals of high integrity within the first few thread turns from the end of the male threaded member, which is the location at which internal pressure is applied to the joint. If the coupling is of uniform wall thickness, a seal at the nose portion of the male thread will be formed in the thickest and therefore potentially strongest portion of the coupling wall. Therefore, a seal having this configuration appears particularly efficient in sealing against high internal pressures.

Effective nose-sealing, whether in pipes of the character described above or embodied in other pipe designs, is difficult to achieve with existing manufacturing control procedures. This difficulty is addressed by several additional aspects of the invention.

Thus, a fourth aspect of the invention includes the combination of a pipe with male thread turns including root, crest, load flank and stab flank, with or without run-out turns, and an integral or non-integral female member with female thread turns for coupling the pipe with other similarly threaded pipes. This combination further comprises the male thread being located on an end of the pipe and including a nose portion which represents about half or less of the total number of regular turns in the male thread, and includes that portion of the male thread which is nearest the terminal portion of the pipe. The female thread is formed for making a threaded connection through matingly compatible and mutually engaging portions of the female thread and a male thread on another pipe substantially similar to the male thread first referred to above, and includes an inner portion which corresponds in length with and threadably engages the nose portion of the similar male thread in made up position. At least the nose portion of the male thread has a diameter sufficiently large in relation to the diameter of at least the inner portion of the female thread to provide root to crest or flank to flank interference fit between at least a portion of the nose and inner portions in the resultant threaded connection. Acceptable and non-acceptable male and female threads are identified in connection with manufacture or preparation for use of the pipe, based on at least one diameter measurement performed in both the nose and inner portions of the male and female threads.

This pipe product, produced by a specified process, departs from prior dimensional control procedures of long standing casing thread standards, required and adhered to by the API. More particularly, the pipe thread standards of that organization require that acceptance and non-acceptance of male and female threads be predicated in part upon diametral measurements at the junction of the regular and run-out thread turns and in the corresponding portion of the female threads, not within the nose and inner portions referred to above. Typically, pipes and couplings are tested for conformity with the API mandated standards with ring gauges and plug gauges Unfortunately as will be shown below, these gauges are to a certain degree "blind" to excessive taper and insufficient diameter at the nose in pipe threads and insufficient taper and excessive diameter in the corresponding portions of couplings. This leads to acceptance of pipes and couplings which may be intended to provide nose-sealing but which are incapable of doing so. Nose-sealing threads according to the foregoing aspect of this invention are generally far more dependable.

Accordingly, the fifth and sixth aspects of the invention are manufacturing methods useful in producing nose-sealing threads as above described as well as in other product designs. Thus, the fifth facet of the invention is a method for the manufacture of a connection between a male threaded pipe and a female threaded member, the pipe thread having its nose portion tapered, and the female thread having its interior portion which threadably engages with the nose portion of the male threaded pipe also tapered at an angle which is divergent with that of said pipe nose portion to ensure that said threads when mated have increasing radial interference in a direction toward the nose portion of the pipe. This method comprises the step of gauging both the male thread on said pipe and the female thread on said female member at substantially their respective portions of maximum interference with each other to ensure that at those locations the amount of interference is within a predetermined range.

An application of a related method to sets of pipes constitutes the sixth aspect of the present invention. It is a method of manufacturing or preparing for use a production run or set of threaded pipes comprising in combination a pipe body, a male thread including a plurality of thread turns including run-out thread turns and at least about four or more regular thread turns at or near an end of said pipe, and a female member including a female thread having four or more thread turns that are matingly compatible with the male thread turns for joining said pipe to a further length of similar threaded pipe. This method comprises the step of measuring, on a plurality of said pipes, a selected diameter of said male thread turns at substantially the same location in the nose portions thereof, within that half or less of the regular thread turns which are nearest said pipe end. Moreover, there is measuring, in a plurality of said female members, of a selected diameter of said female thread turns at substantially the same location in the inner portions thereof, within those female turns which engage with the nose portions of the male threads in fully made-up connections thereof. Such measurements are made on a sufficient number of such male and female threads, the threads are compared with predetermined specifications for said diameters in said nose and inner portions and said measurements and specifications are used to pass or reject a sufficient number of said male pipe threads and female members for causing at least said male threads to exhibit substantially greater diametral precision at the measured male thread locations than at the junction of the male regular and run-out turns. Practice of the foregoing method can provide a number of advantages, among which is a reduction in the proportion of defective in-thread, nose-sealing pipes delivered to the field or installed in wells.

As its seventh facet, the invention provides a threaded connection which facilitates trapping of thread compound within the threads and thus promotes leak resistance, by turning to advantage the Poisson's effect discussed previously. This threaded pipe connection comprises a pipe having root, crest, load flank and stab flank forming a male thread including regular turns with or without run-out turns. The male thread is located on an end of the pipe and has a nose portion which includes plural thread turns representing about half or less of the total regular turns in said male thread and including that portion of the male thread which is nearest the terminal portion of the pipe. There is also a female member having root, crest, load flank and stab flank forming a female thread which is formed for making said threaded connection through matingly compatible and mutually engaging portions of said male and female threads. Included in the female thread is an inner portion which corresponds in length with and threadably engages the nose portion of the male thread when the threaded connection is in made up position, said threaded connection being made through mutually engaged portions of said male and female threads comprising plural turns of said threads. Said connection, when in made up position, has a small gap or gaps filled with thread sealant compound between the flanks of plural turns of the threads. Significantly, the profiles of the male and female threads have a sufficiently small clearance between them and the male thread has a diameter sufficiently in excess of that of the female thread over a sufficient portion of their mutually engaged axial lengths to produce, with the aid of shortening of the female member and/or through lengthening of the pipe, two conditions which occur simultaneously in the threaded connection. First, there is a seal between at least a portion of the male and female stab flanks of the nose and inner portions of the threads. Second, there is load-bearing engagement between at least a portion of the male and female load flanks in the mutually engaged portions of the threads at a location spaced longitudinally from the nose and inner portions. Simultaneous existence of such spaced apart seal and engagement assists in entrapment of said compound within the threads.

Extrusion of the compound from the threads under pressure is thus discouraged, resulting in increased sealing integrity. It has previously been suggested that simultaneous spaced apart load flank engagement and stab flank sealing can be attained in a joint by adjustment of thread lead, i.e. the axial distance from one thread turn to the next. However, the present invention makes it possible to axially adjust the parts and attain this advantageous condition of thread compound entrapment as part of a general axial expansion and/or contraction of the threaded parts resulting at least in substantial measure from radial interference. By this means, the invention makes it possible to avoid the manufacturing and gauging complexities of variable lead threads.

An eighth aspect of the invention includes in combination, a length of threaded pipe comprising a pipe body, a male thread formed on an end of said body with a run-out portion and regular turns having load flank, stab flank, crest and root, and a female coupling member with female thread to enable coupling of said pipe to a further length of threaded pipe. This combination further comprises the male thread being a single step, single lead thread of substantially constant lead of at least about 0.2 and more preferably at least about 0.25 inch. The male thread also has a substantially uniform single taper formed about a central axis with substantial portions of the axial length of its root and crest being rectilinear and parallel to said axis, and includes a nose portion composed of about half or less of said regular thread turns nearest said pipe end. Likewise, the female thread of the coupling has a single step, single lead thread of substantially constant lead of at least about 0.2 and preferably at least about 0.25 inch, and has a substantially uniform single taper formed about a central axis with substantial portions of the axial length of its root and crest being rectilinear and parallel to said axis. Included in the female thread is an inner portion composed of female thread turns which threadably engage with the nose portion of the male thread when said threads are in made-up position. These male and female threads are dimensioned in relation to each other, in both thread profile and diameter, to provide between them flank to flank gaps and a root to crest gap at the major diameter of the male thread and to ensure that a root to crest interference fit will exist between them in made-up position at the minor diameter of the male thread. Such interference gradually decreases along the axial length of the threads in a direction away from the pipe end. However, the amount of interference is also sufficiently large and the gaps are sufficiently small, at the nose portion of said male thread, to provide an in-thread seal which substantially prevents leakage at the maximum internal and/or external pressure rating of said pipe body, and, in the run-out portion of said male thread, to retain threaded engagement with said female thread at the maximum axial force rating and maximum internal and/or external pressure rating of the pipe body, said interference being insufficient to cause either substantial destructive hoop stress yield deformation of said pipe or female member or substantial destructive galling of either of said threads.

This aspect of the invention provides pipes having threaded connections that are particularly simple, safe and effective. In quest of high integrity sealing, an advantage that can be attained by this aspect of the invention, persons skilled in the art have developed relatively more complicated or expensive thread and coupling designs, such as the multiple taper joints shown in U.S. Pat. No. 4,588,213 to Bollfrass, et al, the Kawasaki joints with variable lead threads and the Mannesmann Big Omega (tm) joints. However, the refinements included in some of these prior art connections increase considerably the cost of production of the pipes and/or couplings. Quality control is difficult with multiple taper and variable lead threads because of the problems involved in gauging them. The Big Omega connection has a simpler thread design, but requires non-standard (non-API) couplings and has not been found to equal the absence of self-locking, easy make-up, galling resistance, and combined leak resistance and load capacity which are possible with the present invention.

In addition to the specific advantages mentioned above, the various aspects or facets of the invention each provide one or more of the following general advantages: attainment of a seal in the threads themselves having high pressure integrity when large axial forces are applied to the connection; attainment of high pressure integrity at high axial force in threads formed in relatively thin pipe walls; ability to provide threaded joints having high pressure sealing integrity in the threads and/or high axial force resistance without substantial destructive galling in line pipe or in other pipes of the type generally regarded as prone to galling; ability to provide sealing integrity at high pressure and/or at high axial force in relatively thin wall pipe with "single-" (no-) step threads of substantially constant taper and thread width; ability to form substantially leakproof and very strong connections with API line pipe with or without the use of API coupling stock; ability to make a strong substantially leakproof joint in pipe having male and female threads integral with the pipe body; effective pressure sealing with or without an unthreaded metal to metal seal; effective entrapment of thread compounds; effective pressure sealing with or without internal seal rings in the pipe joints; effective pressure sealing with or without end-to-end abutment of the ends of adjacent pipe sections; ability to form a joint that is substantially leakproof under axial and bending loads with or without polymeric sealing inserts, such as O-rings or seals of partially rectangular or partially rectangular cross-section; and easy makeup with minimal cross-threading. In all likelihood, other advantages will become apparent to those skilled in the art upon using the invention.

BRIEF DESCRIPTION OF THE DRAWINGS

FIG. 1 is a perspective, partially broken out of a first embodiment of a pipe and female threaded member according to the present invention.

FIG. 2 is a perspective, partially broken out of a first embodiment of a pipe and female threaded member according to another embodiment of the invention.

FIG. 3 is a side elevation, enlarged, of a male thread and first end of the pipe illustrated in FIG. 2.

FIG. 4 is a sectional view of a portion of a coupling member similar to that depicted in FIG. 2, the section being taken on the coupling axis, with one of two female threads ordinarily present in such a coupling being omitted and the other being shown with an exaggerated length for purposes of illustration.

FIG. 5 is a longitudinal section through the upper portion of FIG. 3.

FIG. 6 is a longitudinal section through the upper portion of FIG. 4.

FIG. 7A is a schematic diagram of a prior art pipe thread testing technique, showing its application to an acceptable pipe thread.

FIG. 7B is a schematic diagram of the prior art pipe thread testing technique of FIG. 7A, showing its application to an unacceptable pipe thread.

FIG. 7C is a schematic diagram of a prior art female thread testing technique, showing its application to an acceptable female thread.

FIG. 7D is a schematic diagram of the prior art female thread testing technique of FIG. 7C, showing its application to an unacceptable female thread.

FIG. 7E is a side elevation, partly in section, of a pipe thread testing technique which is one facet of the present invention, showing its application to an acceptable pipe thread.

FIG. 7F is a side elevation, partly in section, of a female thread testing technique which is one facet of the present invention, showing its application to an acceptable female thread.

FIG. 8 shows the members of FIGS. 5 and 6 assembled, in longitudinal cross-section.

FIG. 9 is an enlarged portion of FIG. 8.

FIG. 12A is a vertical cross-section which shows the thread cross sections of FIGS. 10 and 11 in made-up position, and particularly those threads and the gaps between them as they would appear at a first position in the vicinity of the transition from regular (e.g. perfect) to run-out threads, as shown in FIG. 8.

FIG. 12B is generally similar to FIG. 12A, but shows the threads and the gaps between them as they would appear at a second position which is intermediate the first position of FIG. 12A and the nose portion of the male thread shown in FIG. 8.

FIG. 12C is generally similar to FIG. 12B, but shows the threads and the gaps between them as they would appear at a third position which is in the nose portion of the male thread shown in FIG. 8.

FIG. 13A is an enlarged portion of FIG. 12C, showing thread compound in the gaps between the threads.

FIG. 14 is a schematic diagram of a well, in section, comprising a string of pipe in accordance with the present invention.

DESCRIPTION OF VARIOUS AND PREFERRED EMBODIMENTS

Figure 10:
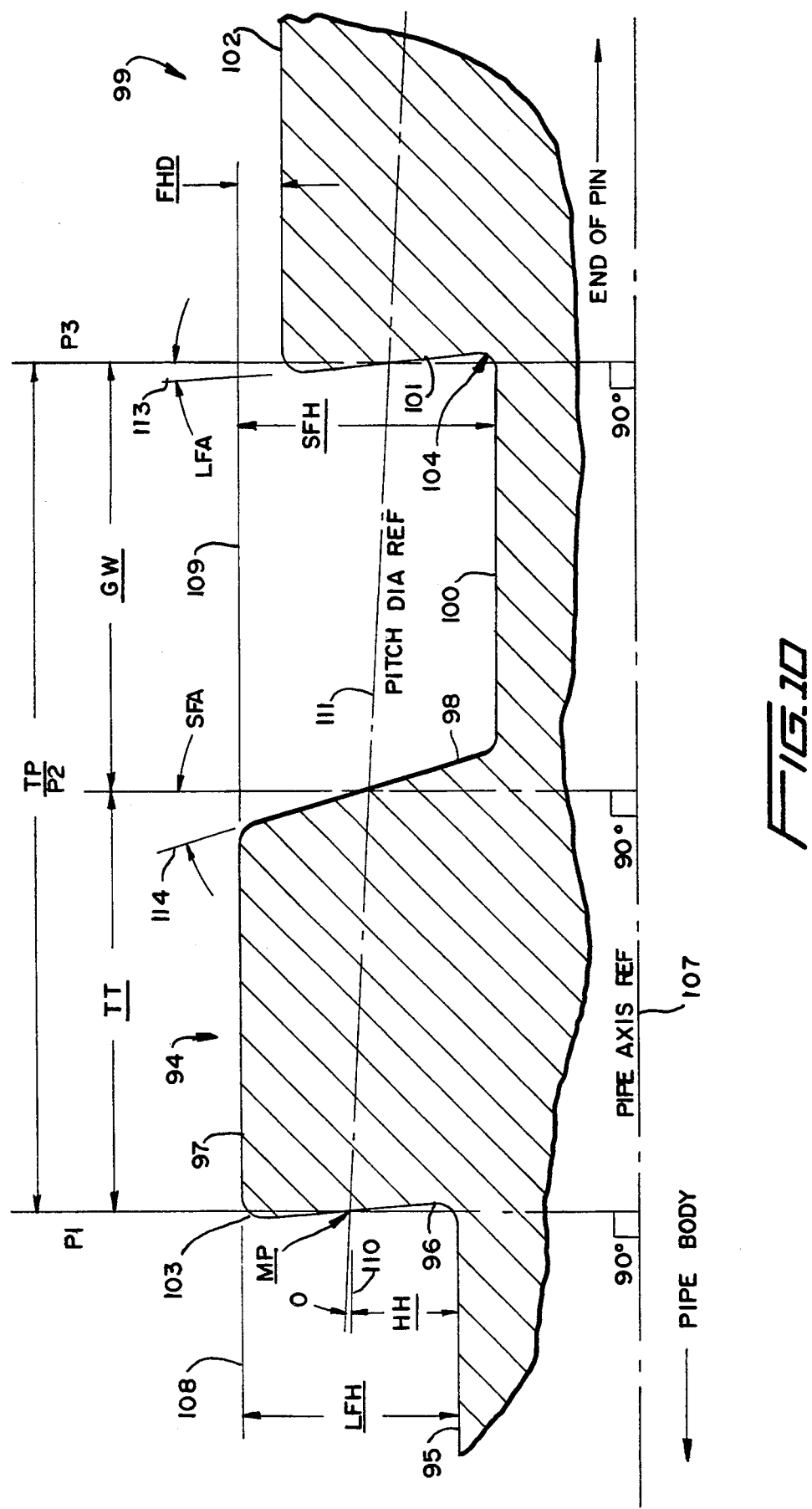
FIG. 10 is an enlarged, radial cross-section through a portion of a preferred male thread for use in the present invention.

FIG. 1 discloses a pipe 1 having a longitudinal pipe axis 2 surrounded by an elongated cylindrical pipe wall 3 having first end 4 and second end 5. The invention has particular advantages for forming threaded connections with pipes of large diameter, such as about 12 to about 60 inches or more, more typically up to about 30 or 24 inches, and is expected to find its most common use in pipes of about 13 and ⅜ to about 20 inches in diameter, particularly with wall thicknesses in the range of about 0.4 to 0.8 inches.

A particularly preferred form of such pipe is that conforming substantially to API Specification for Line Pipe (SPEC 5L), as amended from time to time, or equivalent. This specification was last amended on May 31, 1988. Other types of pipe may be substituted. Male thread 6 is formed in the exterior of pipe first end 4, integral with and formed of the same material as the pipe wall. Portion 7 of pipe wall 3, in which male thread 6 is formed, may be crimped by any suitable means such as cold swedging, and subsequently bored to optimize the distribution of material under the male thread. However, this is not a requirement for the present invention.

At pipe second end 5 is female threaded member 10 having a longitudinal axis 11 surrounded by a generally cylindrical wall 12 with an axially open outer end 13 and including a female thread 14. This thread, integral with and of the same material as wall 12, is substantially complementary to male pipe thread 6. In this embodiment, female thread 14 is formed in an expanded portion 15 of pipe wall 3 which can be formed by any suitable means such as cold swedging. Such techniques of expansion and crimping are particularly useful when working with pipes of particularly small wall thickness.

While the female threaded member 10 and its cylindrical wall 12 may be integral with and of the same material as the pipe wall, as shown in FIG. 1, this is not essential to the practice of the invention. Preferably, as shown in FIG. 2, one may employ a pipe 8 having a longitudinal pipe axis 2, elongated cylindrical pipe wall 3, first end 4, second end 5 and male thread 6 similar to that of pipe 1 in FIG. 1. However, in this embodiment, instead of being integral with pipe wall 3, the female threaded member 19 is formed in a length of coupling stock which has not only female thread 14 and the other attributes of female threaded member 10, but also has an additional female thread 20 for engaging additional male thread 21 at the second end 5 of pipe 8. Couplings fabricated from API coupling stock conforming substantially to Section 8 of the API Specification for Casing and Tubing (SPEC 5CT), as amended from time to time, or equivalents thereof, are particularly preferred. This standard was most recently amended on Mar. 15, 1988. Other types of coupling stock may be substituted.

It is therefore an advantage of the present invention that it can form serviceable joints with good to excellent seal integrity under moderate to very high axial loads from line pipe and other pipes manufactured from a wide variety of materials. Examples include materials that are generally understood to have substantial galling propensities, special alloys selected for their usefulness in hostile environments and even polymeric materials.

Thus, in accordance with the invention, the pipe and/or female member may have a thread or threads formed of steel that contains aluminum and/or other grain refiners in amounts sufficient to provide the steel with a microstructure substantially finer than that of API casing. In addition to the foregoing or in the alternative the thread or threads may be formed of metal characterized by carbon and sulfur contents below or substantially below those of API casing and having a substantial tendency to gall destructively when fully made-up in leak resistant, interference fit threaded joints. Still another example to be combined with or substituted for the foregoing is a thread or threads formed of non-ferrous metal having a substantial tendency of gall destructively when fully made-up in a leak resistant interference fit threaded joint.

A variety of alloys are known which are more resistant to hostile external environments or internal conditions than the steels typically used in API casing and line pipe. Among these are alloys composed substantially of one or more metals from the group of nickel, titanium and aluminum. The pipe and/or female member of the invention may have a thread or threads formed of such an alloy.

It is also contemplated that the pipe and/or female member of the present invention may have walls and/or threads formed at least in part of polymeric material. Examples include polymeric material containing an epoxy, polyester, polyether, acetal or polyphenylene sulfide polymer. Preferably, the polymeric material will be reinforced with glass, carbon or other fiber.

Whether the female threaded member is or is not integral with the material of pipe wall 3, the female thread 14 is substantially complementary to the male pipe thread 6. Thus, the female thread can receive through the outer end 13 the cooperating male thread 22 of another pipe 23 similar to pipes 1 and 8. As will be discussed below, when pipes 1 and 8 are formed in sets with the thread dimensions appropriately controlled, they may be assembled into pipe strings having advantageous pressure resistance and other desirable physical properties even when using economical line pipe.

According to the invention, the male thread 6 of pipe 1 or 8 may have different sections of varying taper. Preferably it has a substantially uniform pipe thread taper over at least the majority and preferably over substantially all of its length, as illustrated with pipe 8 in FIG. 3. The thread has a pitch diameter which may be defined as a conical or pseudo-conical envelope coinciding with a helical line connecting the radial mid points of the height of at least a substantial portion of the load flank. In this embodiment, the male thread pitch diameter substantially coincides, in at least a plurality of its turns, with a conical reference volume 28 that extends through said turns and away from the pipe terminal portion 29 to an apex 30 which is identified as alpha. Preferably the pipe thread 6 has, throughout at least about the major portion of its length, a substantially uniform taper ratio in the range of about 0.05 to about 0.15. This ratio is based, for example, on units of diameter increase per longitudinal unit of distance traveled along the pipe 8 at its axis 2 in a direction away from terminal portion 29. Thus, the pitch diameter of the male pipe thread, over at least about the majority of the thread length, is preferably disposed on a frusto-conical volume that has an included apex angle of alpha, alpha being determined with the pipe end in an unstressed condition. The specific taper is preferably selected in relation to the diameter of the pipe and the range of wall thicknesses of the pipe on which the thread is to be machined, with the object of effecting a balance between increasing taper to promote ease of assembly and limiting taper to provide sufficient thickness (and therefore strength) in the thinnest portion of the pipe wall underneath the thread at the end of the pipe. Thus, for API Line Pipe in the nominal diameter range of about 12 to about 20 inches, a taper of approximately 10 percent (0.1 inches of diameter per inch of length) is preferred.

As shown in FIG. 4, the thread of the female threaded member is also tapered. It may have different sections of varying taper, but preferably has a substantially uniform pipe thread taper over at least the majority and preferably over substantially all of its length. For purposes of illustration, a female threaded member similar to that shown in FIG. 2 has been reversed end for end, and substantially all of that portion of the member which lies to the right of its axis of symmetry 34 has been removed. The remaining portion of the female threaded member, containing the female thread 14, has been shown with an exaggerated length. Female thread 14 also has a pitch diameter as above defined. As shown in FIG. 4, this pitch diameter substantially coincides, in at least a plurality of its turns, with a conical volume 36 extending from the coupling open outer end 13 through the coupling to an apex 37 having an included angle beta. Preferably, at least about the majority of the length of the female thread has a substantially uniform thread taper ratio in the range of about 0.05 to about 0.15, based on units of diameter increase per longitudinal unit of distance in the coupling along the coupling axis in a direction toward open end 13. Thus, the pitch diameter of the female thread, over at least about the majority of its thread length, is preferably disposed on a frusto-conical volume that has an included apex angle beta, measured with the female threaded member in an unstressed condition. Angle $\beta$ is beneficially larger than alpha for creating a slight divergence between said pipe thread and female thread volumes.

According to a preferred embodiment of the invention, the difference between said first and second apex angles is an amount in the range of about 0.01 to about 1 degrees which is sufficient for producing in the wall means at its open end a hoop stress that is lower than the hoop stress in the region of the wall means surrounding the inner portion of the female thread. More preferably, the difference between said angles is in the range of about 0.05 to about 0.7 degrees. Still more preferably, this difference is in the range of about 0.1 to about 0.4 degrees.

FIGS. 5 and 6 respectively show partial longitudinal sections through the male thread and adjacent portion of wall 3 of pipe 8 (of FIGS. 2 and 3), as well as female thread 14 and the adjacent portion of the wall of coupling 19 (of FIGS. 2 and 4). The portion of pipe wall 3 shown in FIG. 5 includes inner surface 41 and outer surface 42, as well as inner and outer chamfers 43 and 44 at the junctions between the inner and outer surfaces and the terminal portion 29. The total length of the threaded portion of wall 3 preferably includes nose portion 45, central portion 46 and run out portion 47. While the thread may include one or more steps, such as between the nose and central or central and run-out portions, or within one or more of these portions, the thread preferably extends continuously from the nose portion through the central portion and still more preferably from the nose portion into the run-out portion, in order that the thread may be simple but functional when combined with other features described below.

Nose portion 45 comprises at least about one and preferably at least about two "regular" thread turns (meaning turns which are part of the main working portion of the thread and which may vary in lead, height or other characteristics according to the thread design, but which are other than lead-in, run-out and vanishing thread turns). The number of regular thread turns in the nose portion may range up to about one third or about one half of the total of all regular turns in the thread. In the present embodiment, nose portion 45 includes both lead-in thread, constituting a partial turn 51, and several full height perfect thread turns 52. Also, in the present embodiment, it is preferred that the central portion 46 be composed of additional perfect thread turns 52.

The length of the perfect thread length interval 56 is carefully selected to promote strength and balanced loading in the resultant threaded connection. Too short a perfect thread length can result in thread shearing. Too long a perfect thread length can produce uneven loading of the thread and premature failure under axial load. The perfect thread length and the amount of taper in the thread also inter-relate with the diameter of the thread at the start of the perfect thread, i.e. at the end of the perfect thread interval nearest the terminal portion 29 of the pipe. This diameter should be chosen small enough to achieve sufficient perfect thread length but not so small as to adversely affect the strength of the pipe end. This is due to the fact that, for a given taper, too long a thread length and too small a diameter can reduce the thickness at the end of the pipe to the extent that the thread will have inadequate resistance to damage from accidental side impact loads. At least about 0.1 inch of metal, measured radially, is preferably present between the chamfers 43 and 44 at the terminal portion 29 of the threaded end of the pipe. Based on these considerations, a perfect thread length interval 56 which is preferably equal to about 2.8 or more times the wall thickness of the pipe body is believed to give good results in API Line Pipes of 12 to 20 inches thickness.

In the present embodiment the run out thread turns 53 of run out portion 47 correspond in profile to perfect thread turns 52 except that their crests coincide with a cylindrical surface, which may for example be the pipe outer surface 42, so that their height gradually diminishes at progressively greater distances from terminal portion 29 until that height becomes zero in a final vanishing thread turn 54. The total number of thread turns in the nose, central and run out portions should be sufficient to bear the design axial compression and tensile loads of the threaded connection. Preferably, the number of thread turns is selected so that the axial force resistance of the resultant threaded connection will substantially correspond to or preferably exceed that of the full thickness of the pipe wall.

Turning now to FIG. 6, the female threaded member composed of coupling 19 having female thread 14 (see also FIG. 4) includes an outer surface 60 and inner surface 61 which, through inner and outer chamfers 62 and 63, intersect with the coupling outer end 13. Female thread 14 preferably includes an inner portion 64 corresponding in length to the nose portion 45 of male thread 6 on pipe 8 (see FIG. 5). The remaining portion 65 of the female thread may for example include a mid-section 66 corresponding to central portion 46 on pipe 8 and an outer section 67 engaging at least a portion, and preferably all, of the run out thread turns 53 in pipe thread run out portion 47. The thread of the coupling inner portion 64 and mid-section 66 preferably also comprises perfect thread turns which engage corresponding perfect thread turns 52 in the pipe thread nose and central portions 45 and 46.

In accordance with the invention, at least one diametral dimension of at least one and preferably of two or three selected thread turns in the nose and inner portions of both male and female threads near planes 55 and 68 respectively is measured and utilized as a control in the process of manufacturing pipes and/or preparing them for use. The turns in question are preferably other than lead-in turns, but may include turns of the groove which exists between the male and female thread turns. According to a preferred embodiment of the invention, the measurements are taken in the nose portion of each pipe and the inner portion or portions of each female threaded member in the total production run, or in a lesser number of parts considered to be substantially representative of those in the run, or in at least a sufficient number of parts to provide adequate error detection. Such measurements are employed for examining the tested parts for compliance with predetermined ranges of pitch diameter or other diametral dimensions, and for accepting and rejecting the pipe and/or female threads of the measured parts.

This is a departure from the usual practice required by API standards, rigidly adhered to by that organization. Traditionally, interference threads like API 8R and BTC have been dimensioned, toleranced and gauged with ring and plug gauges at reference locations corresponding to the position of the last perfect thread on the pipe, i.e. at the transition from perfect to run-out thread. That gauging location is typically at a significant distance from what has been defined as the nose and inner portions of the male and female threads herein. Such a system is not adequate for threaded connections in accordance with the invention, in which internal pressure sealing occurs in the threads of the nose and inner portions.

The inadequacy of the time-honored system for threaded connections of this type is illustrated by FIGS. 7A–7D, which illustrate traditional ring and plug gauging as above described. In FIG. 7A there is a pipe 8A having pipe wall 3A with male thread 6A and terminal portion 29A. This male thread includes lead-in turn 51A, perfect turns 52A, run-out turns 53A and vanishing turn 54A. Thread 6A is undergoing testing in a ring gauge 69 provided with ring gauge thread turns 70. As can be seen in the Figure, the profile of the male thread closely matches that of the ring gauge, and the pipe thus passes the test, when the gauging distance S falls within the established specification.

Turning now to FIG. 7B, we see the testing of a second pipe 8B produced in the same production run as pipe 8A and intended to be identical to it. Thus, pipe 8B has pipe wall 3B, terminal portion 29B and male thread 6B, the latter comprising lead-in turn 51B, perfect turns 52B, run-out turns 53B and vanishing turn 54B. Because of an error in the cutting of pipe thread 6B, it has an excessively fast taper. This results in a space (greatly exaggerated for purposes of illustration) between the nose portion 45B of the pipe thread and the corresponding portion of the ring gauge. Because of the presence of this space, thread 8B does not truly conform to the ring gauge, even though the gauging distance falls perfectly within specification.

However, thread 6B is normal in the location indicated by ring reference plane RRP, the gauging location mandated by API standards. Thus, thread 6B behaves normally when the ring gauge is applied to it, and falsely appears to be satisfactory. The ring gauge does not readily detect threads that are substantially normal in the plane RRP but defective elsewhere, particularly threads that are undersized in the critical nose portion.

An analogous difficulty results when applying standard API plug gauges to couplings. This is illustrated by FIGS. 7C and 7D.

FIG. 7C depicts testing of coupling 19C having an open outer end 13C and female thread 14C (complementary to male thread 6A). Note how thread 14C closely conforms to the thread turns 73 of plug gauge 72. It is an acceptable part, provided gauging distance S is in accord with specification.

Like coupling 19C, coupling 19D of FIG. 7D has an open outer end 13D and a female thread 14D, and is intended to be identical with coupling 19C. It is desired that thread 14D will be complementary to male thread 6A. However, because of an error in cutting thread 14D, its taper is too slow. This produces a space 71D at the inner portion 64D of coupling thread 14D and the corresponding portion of plug gauge thread turns 73.

Because defective thread 14D is normal in the location indicated by plug reference plane PRP, the gauging location mandated by API standards, this thread behaves normally when the plug gauge 72 is applied to it, and coupling 19D falsely appears to be satisfactory. Thus, a plug gauge does not readily detect threads that are substantially normal in the plane PRP but defective elsewhere, particularly threads that are oversized in the inner portion, even though gauging distance S is perfectly within specification.

A defective pipe thread like 6B of FIG. 7B, indicated to be acceptable by ring gauge testing, will in many instances not provide a proper interference fit with a properly formed female thread such as thread 14C of FIG. 7C. The resultant threaded connection is therefore likely to have poor pressure resistance and/or poor strength. This problem is exacerbated upon making up a defective male thread 6B with a defective female thread like 14D of FIG. 7D, both of which threads have been indicated to be normal by ring and plug testing. In such case the errors represented by the spaces 71B and 71D of FIGS. 7B and 7D are additive.

Not only are ring and plug gauges sensitive to the taper of the parts, as shown above, but thread height, lead and ovality also adversely affect the true size of the part as measured by ring and plug gauges. The net effect of these errors is also always cumulative. In other words when gauging distance S is within specification, thread errors in taper, lead, thread height, ovality, etc. combine cumulatively resulting in a male thread that is in actuality smaller than indicated by the ring gauge and a female thread that is in actuality larger than indicated by the plug gauge in the critical nose section of the connection. Such cumulative errors have produced malfunctioning parts and even catastrophic failures.

Because pipes and female threaded members that fit the ring and plug gages can be respectively too small and too big to function properly, use of ring and plug gages in producing pipes and female threaded members according to preferred embodiments of the present invention can generate defective connections. Therefore, a gauging method integral and complementary with the design of these preferred embodiments has been developed. It involves controlling the connection preload (interference) near the end of the pipe. Consequently, the connection is preferably dimensioned, toleranced and gaged from that location.

For example, and preferably, one may make such measurements with diametral dimension testing equipment of the type which includes a caliper device having thread contactors and the necessary accessory attachments for contacting internal and external thread turns at (including on and/or closely adjacent to one or both sides of) a reference plane that is common to each of the tested pipe and/or female threaded member parts, is perpendicular to a pipe or coupling axis and is located within the nose portion of the male thread and the inner portion of the female thread. The external thread turn contactors may and preferably are for example bars which are mounted for radial reciprocation relative to the pipe axis, extend transversely of and perpendicular to the aforementioned reference plane and bridge across at least two and preferably three or more thread turns of a male thread in the nose portion thereof. Similar bars may be used with suitable arms to reach within a female thread and measure a diametral dimension thereof at a predetermined reference plane.

FIGS. 7E and 7F illustrate appropriate diametral dimension testing equipment for pipe and female threaded members, respectively. The pipe caliper device shown in FIG. 7E includes a pair of rail arms 74 (one of which is hidden behind the other in the view) on which are rigidly mounted a pair of adjustable blocks 75 each having a wear plate face 76 for engagement and precise registry with the terminal portion 29E of pipe 8E having pipe wall 3E and male thread 6E. Each block 75 serves as a rigid mount for an adjustable arm 77E which reaches in a generally axial direction from its respective mount over the surface of the thread 6E. There, gauging shoes 78 and their respective spindles, borne on arms 77E, extend radially toward thread 6E for contacting the thread crest. The gauging shoe on the upper arm, along with its spindle, are arranged for radial movement relative to the axis of the pipe, and the spindle is connected through the arm 77E with the sensor of a gauge G for reading the distance between the two gauging shoes.

Instead of bars which rest on the thread crest, one may employ probes sufficiently narrow to reach part way into the thread groove or to its root. With appropriate thread contacting means and technique, one may measure pitch diameter, major diameter, minor diameter, ovality and/or other thread dimensions.

In accordance with the invention, the thread contacting means are positioned and used to contact the thread in its nose portion. In general, the nose portion may include up to about one half and more preferably up to about one third of the first regular thread turns in the male thread, counting from the first turn of male thread nearest the terminal portion of the pipe. More particularly, it is preferred to measure at (including near) the location at which pressure sealing becomes effective. This may for example be within the first to three turns of regular thread and preferably within about 1.7 turns after any chamfer and/or lead-in thread which may be present, and for the most preferred pipes and threads will usually be within about ½ to about 1 inch from that end of the thread nearest the terminal portion of the pipe. Measurements are also taken in those portions of the female thread which correspond to or will engage the indicated locations in the male thread in the fully made up connection.

In this illustrative embodiment, the male lead-in turn 51E is followed by ten perfect turns 52E, several run-out turns 53E and a vanishing turn 54E. Half of the perfect turns, that is the first five perfect turns 52E, constitute the thread nose portion 45E. The figure shows the second and third perfect thread turns being contacted by the gauging shoes 78. More preferably, the shoes contact the first, second and third perfect turns. The approximate position at which the pipe thread would be gauged according to API-stipulated practice is shown by ring reference plane RRP.

The female thread testing device of FIG. 7F is quite similar to and has a number of components in common with the pipe caliper device of FIG. 7E. Thus, the female thread tester includes a pair of rail arms 74 (only one of which is visible) on which are rigidly mounted a pair of adjustable blocks 75. During assembly on bar 74, to accommodate the taking of internal measurements, blocks 75 have been have been rotated from the positions shown in FIG. 7E. The wear plate face 76 of each block engages and precisely registers with the open outer end 13F of coupling 19F having female thread 14F. Each block 75 serves as a rigid mount for one of two adjustable arms 77F which reach in a generally axial direction from its respective mount into the coupling and across the surface of the thread 14F. There, gauging shoes 78 and their respective spindles, borne on arms 77F, extend radially toward thread 14F for contacting the thread crest. The gauging shoe on the upper arm 77F, along with its spindle, are arranged for radial movement relative to the axis of the pipe, and the spindle is connected through the arm with the sensor of a gauge G for reading the distance between the two gauging shoes.

Here again, instead of bars which rest on the thread crest, one may employ probes sufficiently narrow to reach part way into the thread groove or to its root. With appropriate thread contacting means and technique, one may measure pitch diameter, major diameter, minor diameter, ovality and/or other thread dimensions. However, in accordance with a particularly preferred embodiment, the male and female thread diameters are controlled, in their manufacture or preparation for use, by measuring the enveloping frustrum of the male thread major diameter (see FIG. 3) in the nose portion thereof and measuring the inveloping frustrum of the female thread major diameter (see FIG. 4) in the inner portion thereof.

In accordance with the invention, the thread contacting means are positioned and used to contact the female thread in its inner portion. In this illustrative embodiment, the inner portion constitutes those turns of thread 14F of FIG. 7F which correspond to, or would engage, in a fully made-up connection, the turns constituting the nose portion 45E of thread 6E of FIG. 7E. The turns of the female thread that are contacted by the gauging shoes 78 are near the end of the female thread which is remote from the coupling open end 13F and correspond to or would engage, in a fully made-up connection, the male thread turns engaged by the shoes 78 in FIG. 7E. The approximate position at which the coupling thread would be gauged according to API-stipulated practice is shown by plug reference plane PRP.

Any equipment capable of making diametral measurements at the inner and nose portions of the female and male threads may be used. Equipment useful for these purposes is commercially available, a presently preferred example being the MRP 2000 and MRP 2002 series of pitch diameter and ovality gauges manufactured by Gagemaker, Inc. of Houston, Tex., U.S.A.

According to another preferred embodiment of the invention, the thread turn contactors of such equipment are brought into contact with a gauging zone comprising one and preferably at least two adjacent thread turns of the male threads of the pipes in a production run of pipe, such as thread 6 of FIG. 5, at pipe gauge reference plane 55 located within nose portion 45 in FIG. 5, this plane being perpendicular to pipe axis 2 (which is shown in FIGS. 1, 2 and 3). In the manufacture of a production run of the couplings 19 of FIG. 6 and other female threaded members according to the invention, the thread turn contactors of such equipment are brought into contact with a gauging zone comprising one and preferably at least two adjacent thread turns of the female threads of the couplings at gauge reference plane 68. In this preferred embodiment, the gauge reference plane 68 is generally perpendicular to the axis and substantially within inner portion 64 of female thread 14. In such production run, with the aid of measurements as above described, the threads are held within a tolerance of ±0.005 and preferably ±0.002 inches, on the diameter.

If pipe 8 and coupling 19 are both designed so that the thread of the pipe nose portion 45 will be engaged with the thread of the coupling inner portion 64 when the threaded connection is fully made up, gauging both the pipe thread and the coupling thread in the above manner results in application of the production controls to diametral dimensions in substantially corresponding portions of the threads on both of the mating parts. This is illustrated for example in FIG. 8.

FIG. 8 shows the male thread of FIG. 5 and the female thread of FIG. 6 in a fully made up condition. The respective male and female threads have been designed and dimensioned such that in a fully made up condition their gauge reference planes 55 and 68 will generally coincide. Thus, they will coincide exactly or be located within about one or two thread turns of each other. FIG. 8 shows these reference planes in exact coincidence with each other.

As can be seen in FIG. 8, nose portion 45 of male thread 6 is engaged with inner portion 64 of female thread 14. Similarly, male thread central portion 46 is engaged with the female thread mid-section 66. Moreover, male thread run out portion 47 is engaged by female thread outer section 67.

In accordance with the invention, the dimensions of the male and female thread within their respective nose and inner portions 45 and 64 are established such as to create an interference fit between at least said portions. Thus, when measurements taken in the nose and inner portions of the male and female thread are used as manufacturing controls over the dimensions of the respective thread, such controls are exercised upon those portions of the engaged threads in which an interference fit is to be established. When all or a portion of the remainder of the thread turns have a lesser amount of interference than in the nose and inner portions, and measurements taken in the nose and inner portions of the male and female thread are used as manufacturing controls over the dimensions of the respective threads, such controls are applied to that portion of the engaged threads in which the diametral dimensions of the thread are most critical.

Preferably, the male and female thread have an interference fit over at least about half of the axial length of their mutually engaged length. Thus, the dimensions of the male and female threads are established such that in a fully made up threaded connection they will be in interference fit throughout the engaged nose and inner portions 45 and 64, as well as at least in a portion of or even substantially all of the central portion 46 and mid-section 66. According to a particularly preferred embodiment, the male and female threads have an interference fit throughout substantially all (including all) of the axial length of their threaded engagement. Thus, in this preferred embodiment, the nose, central and run out portions 45, 46 and 47 of male thread 6 have an interference fit with the inner portion 64 and all of those thread turns in the remaining portion 65 of female thread 14, which are engaged with run out thread turns 53. Preferably, the interference between the male and female threads, which may be in their nose and inner portions, or in additional portions up to and including their entire axial length, is radial root to crest interference.

Tapered threads will cause the radial thicknesses in the pipe and female threaded member walls behind the threads to vary along their length and therefore generate an irregular interference stress along the length of the thread. To control this effect, the tapers of the male and female threads are controlled to different specific values. As described above, at least the nose portion 45 of male thread 6 and at least the inner portion 64 of female thread 14 of coupling 19 preferably have divergent tapers, i.e. the apex angle $\beta$ of the female thread 14 (FIG. 4) is greater than the apex angle alpha of the male thread (FIG. 3), so that the amount of interference between the pipe thread and coupling thread diminishes at progressively greater distances away from the pipe terminal portion 29 in the direction of coupling outer end 13. Preferably this divergence of the tapers continues into and preferably throughout the male thread central portion and female thread mid-section 66. Thus, according to a particularly preferred embodiment of the invention, the gradual reduction in interference between the male and female thread extends into and preferably substantially throughout central portion 46 and mid-section 66.

According to the best embodiments of the invention, the above-mentioned divergence continues into or preferably substantially throughout the run out portion 47 of the male thread and preferably also throughout that portion of the female thread outer section 67 which confronts the run out thread turns 53. According to a particularly preferred embodiment, the amount of divergence and ensuing amount of interference between the thread is preferably sufficient to keep all of the run out thread turns 53 fully engaged with the female thread turns that confront them. While persons skilled in the art will readily select and vary the quantity of interference provided it is considered best to provide as much interference as possible in the nose and inner portions of the thread to obtain optimum leak resistance while applying surface treatments and/or lubricants and/or restricting the amount of interference as necessary to control galling. It is also considered best for the divergence of the male and female thread apex angles to continue into and preferably through at least a substantial portion of the male thread central portion 46 and female thread mid-section 66, and for these parts of the respective threads to have less interference than is present in the nose and inner portions 45 and 64. The amount of interference is preferably still less between the run out thread turns 53 and those female thread turns of the outer section 67 which confront and engage the run out thread turns. However, the amount of divergence between the male and female thread is preferably controlled in such a way as to produce sufficient interference between run out thread turns 53 and the female threads which engage them, so that all of the confronting male and female thread turns will remain in tight fitting engagement; however, the amount of interference near the open end of the female threaded member should be restricted to the extent that the wall hoop stresses induced in its wall when the threaded connection is fully made up, will not exceed the yield stress of that wall.

Large diameter pipe is usually not perfectly circular. Also, the presence of thread, and especially imperfect thread, on that portion of the pipe which is outside of the coupling, can adversely affect joint tension performance.

In light of the foregoing, it is recommended that certain preferred embodiments be employed when the male thread present in the pipe wall includes both regular thread turns and run-out thread turns. In such circumstances, it is preferred that at least a portion of the run-out thread turns have a crest which has been machined to a common diameter with an adjacent unthreaded portion of the pipe wall, which unthreaded portion is of reduced diameter relative to portions of the pipe wall not so machined. According to another preferred embodiment which may be applied with or without the foregoing machining, the run-out thread turns are present in a longitudinal distance interval of the pipe wall which is of restricted length, for remaining such thread turns substantially completely within the wall means of the female when the threads are in made-up position. Another beneficial modification which may be used alone or in combination with the foregoing is having the female thread turns positioned in the female member for causing substantially all of the run-out turns to be threadedly engaged by female thread turns which have their crests bottomed in the root of the run-out thread turns, when the threads are in made-up position.

Thus, it has been found beneficial to machine the outside diameter of the pipe to a near cylindrical dimension having a specific diameter which is in agreement with the design diameter which the perfect thread has at the transition from run-out thread to perfect thread, and is consistent with the specification under which the pipe body is manufactured. The machining is preferably designed and applied in conjunction with the female threaded member and thread lengths so that all of the nose, central and run-out portions of the male thread are overlapped by or within the female threaded member when the threaded connection is in a fully made-up condition.

FIG. 9, an enlarged portion of FIG. 8, discloses details of the foregoing particularly preferred forms of threaded connections. Thus, according to the present preferred embodiment of the invention, it is considered best for that portion of the wall 3 of pipe 8 which will be within coupling 19 to be machined to a controlled outside diameter 79, which is of slightly reduced diameter relative to the remainder of that wall, i.e. to the pipe wall portions 80 not so machined. Also machined to the same reduced diameter is the crest of the run-out thread turns 81 up to their transition to perfect thread turns 52. For large diameter API line pipe, it has been found useful for the machined portion to have a diameter about 0.05 to about 0.025 inch larger than the nominal pipe size, in inches.

It is also considered best that in the longitudinal distance interval 82 within which run-out thread turns 81 are present, all such run-out turns should be engaged with female thread turns 83. Moreover, it is believed that in embodiments of the invention, particularly those involving female members with thin walls (e.g. special clearance couplings) unthreaded pipe portion 84 of controlled diameter 79 should be confronted by and engaged by one or more female thread turns 88 that do not engage run-out threads.

Also according to FIG. 9, the embodiments of the invention presently considered best include a controlled counter bore in the female threaded member e.g. an unthreaded female threaded member wall cylindrical inner surface 89. This surface may be bounded on one side by coupling thread chamfer 90 and on the other side by a counter-bore chamfer 91 connecting the counterbore with the coupling end 13. Such a counterbore acts as a stiffening ring to help maintain thread contact at the run-out thread. It also helps to prevent thread damage on the coupling starting thread.

The invention may be applied to threads of varying design, such as those with generally flat or curved crests and roots, and those with crests and roots parallel and non-parallel to the longitudinal axis of the pipe female threaded member. However, FIGS. 10 through 13 depict a preferred type of thread for use in the invention. In FIG. 10, one perfect thread profile 94 includes a root 95, load flank 96, crest 97 and stab flank 98. The figure shows another partial perfect thread profile 99 having root 100, load flank 101 and crest 102. While it may, in certain circumstances, be found desirable to embody the invention in pipes and female threaded members in multi-start thread systems with plural thread helices, it will be appreciated that what appears in the preferred embodiment of FIG. 10 as two different crests 97 and 102 of two different thread profiles 94 and 99 are but corresponding parts of different turns of a single continuous helical surface of a single thread helix. The same is of course true of the roots 95 and 100, and of load flanks 96 and 101, respectively. However, it is sometimes convenient to refer to these parts of different turns of the same helix, especially when they are viewed in longitudinal cross-section, as though they were in fact parts of separate threads.

The corners between the thread crest, flanks and root of FIG. 10 are relieved by radiuses 103 and fillets 104. With the exception of the aforementioned radiuses and fillets the respective root, flanks and crest of this embodiment are substantially composed, and still more preferably consist essentially of, surfaces that appear as rectilinear lines in longitudinal cross-sections which include the pipe axis. Thus, preferably, the male and female threads have crests and roots, as viewed in longitudinal cross-section, which include rectilinear bearing surfaces of substantial length in the axial direction.

One may select a wide variety of different thread profiles for use in the invention, including for example buttress, hook and other forms with flat and non-flat crests and/or with crests parallel and non-parallel with respect to the pipe and coupling axes. Preferably, the threaded connection is configured to give good stabbing characteristics. Since appropriate tapers for single- (i.e. no-) step threads in some of the diameter ranges contemplated for use in the invention can be within the range of self-locking tapers, in those circumstances it is preferred that the thread crests and roots not be parallel to the taper. More preferably, to promote good stabbing characteristics, threads having crests and roots parallel to the pipe axis may be used. This is illustrated in FIG. 10, which contains axis reference line 107 that is parallel to the pipe longitudinal axis 2 (see FIGS. 1, 2 and 3). With the aid of axis reference line 107, it will be seen that the crest and root, as viewed in the above-identified cross-section, are at least substantially parallel to, and preferably exactly parallel to, the pipe axis.

The preferred male thread of FIG. 10 is composed to a substantial extent of turns having a substantially uniform load flank height which is illustrated for example by the distance LFH between root 95 and a load flank height reference line 108 coinciding with crest 97 of thread profile 94. Thus, the height of the load flank at 96 on the thread turn represented by profile 94 is the same as that of the load flank on all other turns in this same pipe. Similarly, the depicted thread is composed substantially of thread turns in which the stab flanks have heights that are substantially similar to each other, the height of exemplary stab flank 98 being illustrated in the Figure by the height SFH measured between root 100 and stab flank reference line 109 which coincides with the crest 97 of profile 94. In a tapered thread having thread roots and crests parallel to the pipe axis the stab flanks will ordinarily have a larger height SFH than the height LFH of the load flanks, and the resultant difference in height is shown by the flank height difference FHD, measured between crest 102 and reference line 109.

The load flank (e.g. as illustrated at 96 and 101) has a half height HH which is illustrated by the distance HH between the root at 95 and half height reference line 110 adjacent the load flank at 96. Reference line 110, which is parallel to the pipe axis, bisects the load flank at 110, and load flank half height HH therefore equals half of load flank height LFH. MP, the mid-point of the load flank surface at any point in its revolution, is defined by the intersection of the load flank surface with its bisector as viewed in any longitudinal cross-section including the pipe axis.

Pitch diameter reference line 111 is a straight line which connects the mid-points of a plurality of turns of the load flank, viewed in a given longitudinal pipe cross-section that includes the pipe axis. When such line 111 is rotated in space about the pipe axis while maintaining coincidence with such midpoints, it defines a conical envelope which coincides with the pitch diameter of the thread, having pitch angle theta. In view of the gradual reduction in the pitch diameter in the direction of the terminal portion 29 of the thread, the crest of the thread defines a helical surface of progressively decreasing diameter which is referred to herein as a helical pipe thread major diameter. The situation with respect to the thread root is similar, defining a helical surface of progressively decreasing diameter which is referred to herein as a helical pipe thread minor diameter. Thus, the present preferred embodiment may be described as the combination of a pipe thread crest and a pipe thread root that respectively define plateaus and valleys substantially parallel to the pipe axis when viewed in longitudinal cross-section, the crest having a helical pipe thread major diameter and the root having a helical pipe thread minor diameter. Also in this embodiment, the pipe thread has a substantially uniform height measured between the respective elevations of said plateaus and valleys.

The dispositions of thee load and stab flanks are conveniently referenced to planes that are perpendicular to the pipe axis and also intersect those flanks, such as planes P1, P2, and P3 of FIG. 10. Persons skilled in the art may prepare embodiments of the present invention in which either or both of the flanks coincide with such a plane, i.e. either or both of the flanks is radially disposed, but it is ordinarily preferred that one or both of the flanks is angled relative to such plane. In accordance with the present preferred embodiment, the load flank and stab flank are each angled relative to its respective reference plane.

For purposes of the present disclosure and claims, a substantial load-bearing portion stab flank whose radially outermost half is mostly inclined from its reference plane in a direction away from the terminal portion of the pipe is said to be positively inclined, while the opposite form of inclination is referred to as negative. The reverse situation applies with the load flank, which is said to be negatively inclined if most of its radially outermost portion is inclined from its reference plane in a direction away from the terminal portion of the pipe.

The stab flank angle may be adjusted over a substantial range. In accordance with the present particularly preferred embodiment, the stab flank is positively inclined or in other words has a positive stab flank angle. For example angles in the range of about 10 to about 45 and more particularly about 12 to about 30 degrees may be used, an angle of about 17 degrees being used in the presently preferred embodiment.

The load flank angle may also be adjusted through a substantial range, and angles in the range of about $+30$ to about $-15$ degrees may be used. However, the load flanks are preferably negatively inclined, and angles in the range of about $-3$ to about $-10$ degrees are preferred, with an angle of about $-5$ degrees being employed in the presently preferred embodiment.

Thread height and load flank angle are interrelated, and by using a negative load flank angle the thread height can be reduced. This facilitates attainment of a sufficiently long perfect thread length interval, with ensuing thread shear strength in tension or compression, while maintaining sufficient anti-jumpout performance in the threaded connection without causing undue thinness of the pipe and/or coupling walls that back up the male and female threads. This is illustrated by the angle LFA defined by reference plane P3 and load flank angle reference line 113 which coincides with the adjacent load flank surface 101 in FIG. 10. By way of illustration, and preferably, in pipe of about 12 to about 20 inches diameter, with a thread having a pitch of about 0.333 inches, a basic thread height of 0.085 (measured at the load flank) may be used in combination with a negative five degree ($-5$ degrees) load flank angle to give favorable anti-jumpout characteristics and good axial tension capacity.

Large diameter pipe can also be subject to compressive axial loading. To promote maximum compression resistance, the stab flank angle may be kept as low as practical. However, the strategy of restricting the stab flank angle may be limited to a degree by the amount of included angle required between the load and stab flanks for trouble-free machining of the thread. In general, the positive angle of inclination of the stab flank surface 98 will generally be larger than the negative angle of inclination of the load flank. Having the stab flank angle larger provides a degree of convergence between the stab flank and load flank as viewed on the same turn of the thread and in a common longitudinal plane including the pipe axis. This convergence causes the negatively inclined load flank and positively inclined stab flank to define a small included angle between them which is sufficient to promote ease of machining these flanks. This angle may for example be in the range of about 10 to about 20 degrees, more preferably about 12 to about 15 degrees, with about 12 degrees being preferred at present. This is illustrated by the angle SFA between reference plane P2 and stab flank angle reference line 114 that coincides with the adjacent stab flank surface Reference planes P1, P2 and P3 are positioned at intersections between the pitch diameter reference line 111 and the thread flanks in a given longitudinal cross-section which also includes the pipe axis. The distances between these planes therefore provide convenient points of reference for the thread pitch, for the thickness of the helical thread and for the width of the adjoining helical groove.

Persons skilled in the art may readily select pitches differing from those disclosed herein. However, for the preferred API Line Pipe in diameters of about 12 to about 20 inches that is particularly preferred for use in the present invention, about 2 to about 5 single-lead thread turns per inch, a pitch of about 0.5 to about 0.2 inches, is preferred; while a pitch of about 0.333 inches or three turns per inch is currently considered best for a 20 inch pipe. This is illustrated for example by the distance TP between reference planes P1 and P3.

The thread thickness and the width of the adjoining helical groove are preferably substantially similar and preferably about equal, but thread patterns of differing thread thickness and groove width may be used. For example such thickness and width may each vary in a complimentary fashion in the range between about 40 and about 60 percent of the total thread pitch. For the particularly preferred embodiment having a thread pitch of 0.3333 inches on 20 inch pipe, referred to above, the presently most preferred thread thickness is in the range of about 0.1647 to about 0.1667 inches, while the preferred width for the adjoining groove is in the range of about 0.1677 to about 0.1697 inches. It is also preferred to arrange the threads in the threaded connection so that in a substantial portion, preferably in at least the major portion of the engaged turns and preferably in substantially all of the engaged turns, each turn bears on only one of its flanks. The thread thickness is illustrated by the distance TT between reference planes P1 and P2, while the groove width is illustrated by the distance GW between reference planes P2 and P3.

Figure 11:
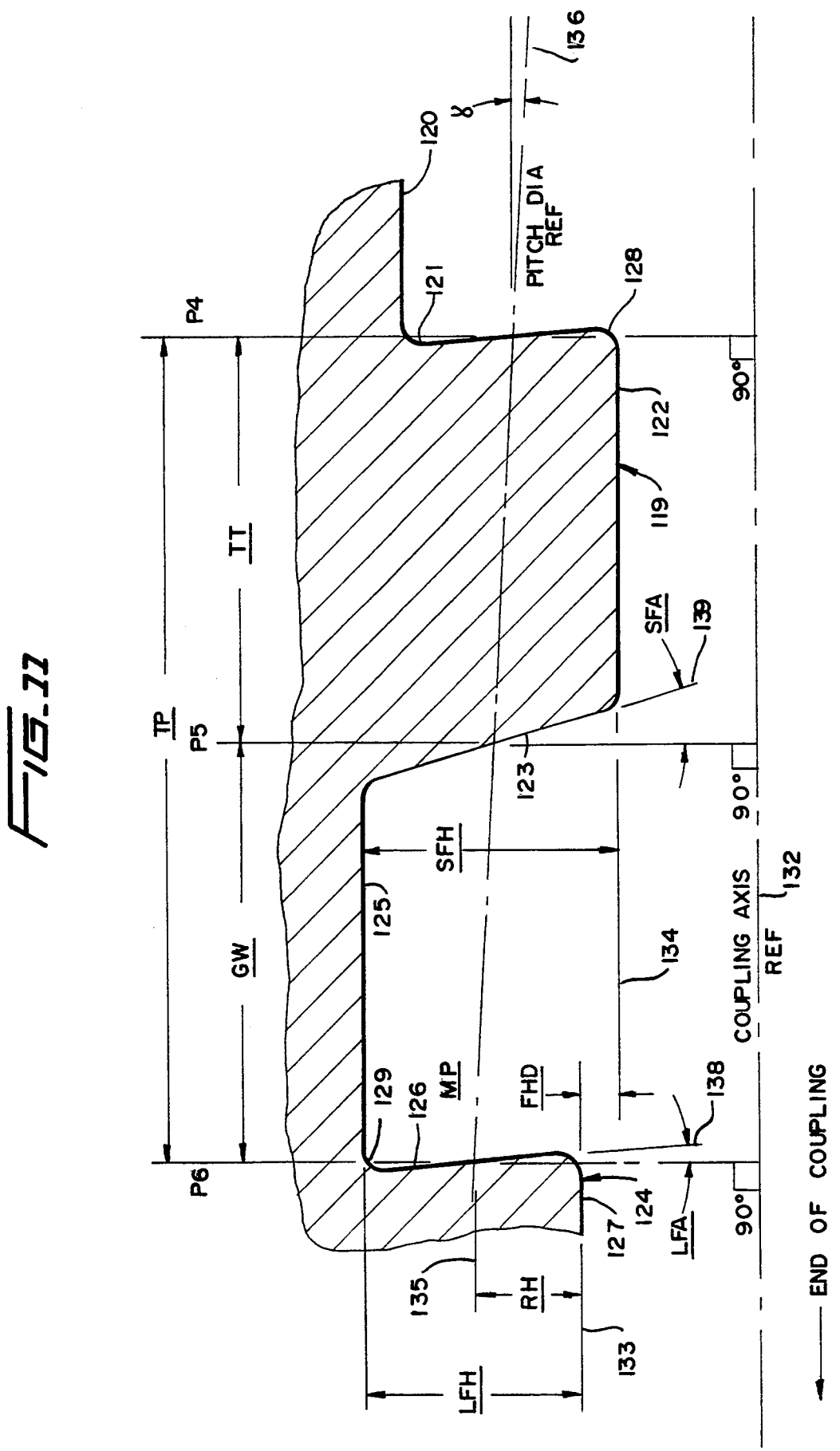
FIG. 11 is an enlarged, radial cross-section through a portion of a preferred female thread, matingly compatible to that shown in FIG. 10, for use in the present invention.

FIG. 11 shows a female thread complementary to the male thread of FIG. 10. In FIG. 11, one perfect thread profile 119 includes a root 120, load flank 121, crest 122 and stab flank 123. The figure shows another partial perfect thread profile 124 having root 125, load flank 126 and crest 127. The corners between the thread crest, flanks and root are relieved by radiuses 128 and fillets 129. With the exception of the radiuses and fillets the root, flanks and crest of this female thread are substantially composed, and still more preferably consist essentially of, surfaces that appear as rectilinear lines in longitudinal cross-sections which include the coupling axis.

FIG. 11 contains axis reference line 132 which is parallel to the female member or coupling longitudinal axis 11 (see FIGS. 1, 2 and 4). Reference line 132 shows that the crest and root, as viewed in the above-identified cross-section, are at least substantially parallel to, and preferably exactly parallel to, the pipe axis.

The preferred female thread of FIG. 11 is composed to a substantial extent of turns having a substantially uniform load flank height which is illustrated for example by the distance LFH between root 125 and a load flank height reference line 133 coinciding with crest 127 of thread profile 124. Thus, the height of the load flank at 126 on the thread turn represented by profile 124 is the same as that of the load flank on all other turns in this same female threaded member. Similarly, the depicted thread is composed substantially of thread turns in which the stab flanks have heights that are substantially similar to each other, the height of exemplary stab flank 123 being illustrated in FIG. 11 by the height SFH measured between root 125 and stab flank reference line 134 which coincides with the crest 122 of profile 119. In a tapered thread having thread roots and crests parallel to the pipe axis the stab flanks will ordinarily have a larger height SFH than the height LFH of the load flanks, and the resultant difference in height is shown by the flank height difference FHD, measured between crest 127 and reference line 134.

The load flank, e.g. as illustrated at 121 and 126, has a reference height RH which is illustrated by the distance RH between the crest at 127 and reference height reference line 135 adjacent the load flank at 126. Reference line 135, which is parallel to the pipe axis, intersects with the load flank 126 at a position corresponding to the male thread half height reference line 110 of FIG. 10. Thus, the male thread load flank half height HH equals the female load flank reference height RH. RH, the female load flank reference helix is defined by the intersection of the load flank surface with reference line 135 as viewed in any longitudinal cross-section including the pipe axis.

Pitch diameter reference line 136 is a straight line which connects corresponding points on a plurality of turns of the load flank, viewed in a given longitudinal pipe cross-section that includes the pipe axis. When such line 136 is rotated in space about the pipe axis while maintaining coincidence with such points, it defines a conical envelope which coincides with the pitch diameter of the thread, having pitch angle gamma. In view of the gradual increase in the pitch diameter in the direction of the open end of the coupling, the crest of the thread defines a helical surface of progressively increasing diameter which is slightly larger than the helical pipe thread minor diameter. The situation with respect to the thread root is similar, defining a helical surface of progressively increasing diameter which is referred to herein as a helical pipe thread major diameter. Thus, the present preferred embodiment may be described as the combination of a pipe thread crest and a pipe thread root that respectively define plateaus and valleys substantially parallel to the pipe axis when viewed in longitudinal cross-section, the crest having a helical pipe thread minor diameter and the root being a short distance outside the helical pipe thread major diameter. Also in this embodiment, the pipe thread has a substantially uniform height measured between the respective elevations of said plateaus and valleys.

The dispositions of the load and stab flanks are conveniently referenced to planes that are perpendicular to the pipe axis and also intersect those flanks, such as planes P4, P5, and P6 of FIG. 11. Persons skilled in the art may prepare embodiments of the present invention in which either or both of the flanks coincide with such a plane, i.e. either or both of the flanks is radially disposed, but it is ordinarily preferred that one or both of the flanks is angled relative to such plane in the manner described above in reference to the male thread. This is illustrated by the angle LFA defined by reference plane P6 and load flank angle reference line 138 which coincides with the adjacent load flank surface 126. As with the male thread, the positive angle of inclination of the stab flank surface 123 will generally be larger than the negative inclination of the load flank. This is illustrated by the angle SFA between reference plane P5 and stab flank angle reference line 139 that coincides with the adjacent stab flank surface 123.

Planes P4, P5 and P6, being positioned at intersections between the pitch diameter reference line 136 and the thread flanks in a given longitudinal cross-section, provide convenient points of reference for the thread pitch, for the thickness of the helical thread and for the width of the adjoining helical groove. While persons skilled in the art may readily select pitches differing from those disclosed herein, for the preferred API coupling stock the female thread pitch is the same as that for the male thread. This is illustrated for example by the distance TP between reference planes P4 and P6.

While the thread thickness and the width of the adjoining helical groove are preferably substantially similar and preferably about equal, thread patterns of differing thread thickness and groove width may be used. As with the male thread, the thickness and width of the female thread may each vary in a complimentary fashion in the range between about 40 and about 60 percent of the total thread pitch. For the particularly preferred embodiment having a thread pitch of 0.3333 inches on 20 inch coupling stock, referred to above, the presently most preferred thread thickness is in the range of about 0.1636 to about 0.1656 inches, while the preferred width for the adjoining groove is in the range of about 0.1666 to about 0.1686 inches. The thread thickness is illustrated by the distance TT between reference planes P4 and P5, while the groove width is illustrated by the distance GW between reference planes P5 and P6.

FIGS. 12A, 12B and 12C show the threads of FIGS. 10 and 11 as they would preferably appear in a fully made up condition. In accordance with the invention, one may provide an interference fit with bearing of the corresponding portions of the male and female crests and roots against one another at the minor diameter, at the major diameter or at both. Because crests 122 and 127 of the female thread of the present preferred embodiment have a smaller diameter, in an unstressed condition, than the roots 95 and 100 of the male thread, also in an unstressed condition, there is an interference fit between the crests and roots at the minor diameter. Thus, as shown in FIG. 12A, the aforementioned female thread crest bears upon the male thread root in an interference fit 144 at a minor diameter of the resultant threaded connection, identified by minor helical diameter reference line 145, which coincides with the crest of the female thread.

The connection also has a major diameter, identified by major helical diameter reference line 146, which is a helical surface coinciding with the crests of the male thread. There, in accordance with this preferred embodiment, a controlled gap or radial clearance 147 is provided. Preferably, this gap is made as large as necessary to avoid galling or contact of the male and female threads at their major diameters, notwithstanding typical variations in the male thread height and female groove depth, but no larger than can be sealed successfully with available thread sealants and/or lubricants, as will be discussed further below in connection with FIG. 13.

A number of advantages flow from having an interference fit at the minor diameter and a controlled gap at the major diameter. The dimensions of the male and female thread are much more readily controlled at the minor diameter than at the major diameter, thus facilitating production runs of pipe thread and female threaded members of greater precision and better controlled galling tendencies, while improving their uniformity of performance in pressure resistance. Such placement of the interference fit also tends to minimize the impact of damage to the thread during initial stabbing. Where there is interference at the minor diameter and a controlled gap at the major diameter, any galling which may occur is more likely to occur at the minor diameter where it can be more readily repaired. This facilitates field repair of the thread.

Preferably, the threaded connections according to the invention also include longitudinal clearances between thread turns, manifested as gaps between adjacent portions of the load and/or stab flanks of the threads. The location and magnitude of the gaps on the load and stab flanks can change within the thread length due to Poisson's effect. As steel and other pipe fabrication metals are strained in one direction, they lengthen or shorten in other directions. This effect may be utilized alone or in conjunction with other thread, pipe and connector properties to create "flank damming," a preferred form of threaded connection in which there is a seal between at least a portion of the male and female stab flanks in the nose and inner portions of the threads and load-bearing engagement between at least a portion of the male and female load flanks in the mutually engaging portions of the threads at a location spaced longitudinally from the nose and inner portions, for assisting in entrapment of thread compound.

For example, in or near that portion of the preferred male threads of the invention where the perfect thread turns become run-out thread turns, the male and female threads preferably bear against one another at their load flanks. This is illustrated in FIG. 12A. In this connection note the load flank engagement 148. The portions of the threads illustrated in this figure correspond approximately to the thread turns identified by the reference numerals 6 and 14 of FIG. 8. Preferably, as shown by FIG. 12A, there is a small clearance 149 between the stab flanks in these same portions of the threads.

Also, preferably, at a position relatively nearer the nose and inner portions of the threads, there is clearance between both the load and stab flanks. This is illustrated by FIG. 12B, which illustrates portions of the threads corresponding approximately in axial position to the right-hand ends of the female thread mid-section 66 and male thread central portion 46 shown in FIG. 8. Note that the load flanks are not engaged, having a small load flank clearance or gap 150 between them. The stab flank clearance 149 is correspondingly reduced.

However, see FIG. 12C, which shows the first few thread turns in the nose and inner portions of the threads. There, adjacent terminal portion 29 of the pipe (FIG. 8), a high contact pressure or seal 151 preferably exists between the male and female stab flanks, while the load flank clearance 150 is correspondingly enlarged. This leaves all of the thread width gap at the load flanks.

One or more of the following properties may be manipulated to attain the desired longitudinal positioning of load and stab flanks and the axial gaps between them: taper and divergence in taper of the male and female threads, amount of radial interference between the male and female threads, ability of the female threaded member to shorten on diametral expansion thereof, ability of the male thread-bearing end of the pipe to lengthen on diametral contraction thereof, length of the mutually engaging portions of the male and female threads, and the design spacing (unstressed condition) or longitudinal nearness respectively of the male and female load flanks and of the male and female stab flanks. Small pitch differences may also be employed for this purpose. In the preferred threaded connections, one or more of the foregoing properties are sufficient, in combination, to produce relative shortening of the female threaded member as compared to the thread-bearing end of the pipe by expansion and/or contraction of at least one of these parts, leading to the above-described load flank engagement and stab flank seal.

As illustrated in part by FIG. 13A, the threaded connection is sealed with the aid of a thread compound, which may have sealing and/or lubricating properties. Such filling preferably exists over a substantial portion of the mutually engaged length of the threads. More preferably, where the threaded connection includes the above-described load flank engagement and stab flank seal, such filling exists substantially throughout that longitudinal interval between the said engagement and seal. As shown in the figure, such gaps as exist between the thread roots and crests and between the thread flanks are filled with compound. Thus, compound 154 extends through gap 147 between crest 97 and root 125 of thread profiles 94 and 124, and through the gap between the adjoining thread flanks, the gap 150 between load flanks 96 and 126 having been shown in this case for purposes of illustration.

The above-described radial interference, clearances, load flank engagement and stab flank seal may be and preferably are utilized to place the compound within the threads under sufficient preload to provide substantial pressure integrity in the resultant threaded connection. In gasket seals, the gap and the amount of preload between the mating members affects pressure integrity. Preload is also a factor in the threaded connections of the present invention. Thus, the preload between the threaded members is controlled: by the amount of interference between the male and female threaded members, i.e. the amount that the female threaded member must expand and the pipe must contract during power makeup; by the gaps in the thread, i.e. the gaps between the thread roots and crests and the load and stab flanks; and by the load and stab flank engagement illustrated in FIGS. 12A and 12C.

Exemplative and useful levels of interference may for example be expressed as a bearing diameter ratio in which the numerator is the diametral difference between bearing diameters of the interfering parts and in which the denominator is the bearing diameter of the female thread. The term "bearing diameter" refers to a diameter of a portion of a male thread and a diameter of a corresponding portion of a female thread, in an unstressed condition, which thread portions are intended to bear against one another in an interference fit. For example, the interference fit in the nose, inner and other portions of the threads may be characterized by the male and the female threads having predetermined pitch diameters, and by the pipe thread having a pitch diameter, in an unstressed condition, which exceeds the pitch diameter of the corresponding portion of the female thread, in an unstressed condition, by a bearing diameter ratio in the range of about 0.0005 to about 0.005 inches of such excess per inch of female thread pitch diameter. More particularly, and especially when the male and female threads are of metallic material, said ratio may be in the range of about 0.001 to about 0.005 inches per inch. Still more preferably said ratio is in the range of about 0.0015 to about 0.0025 inches per inch, with about 0.002 inches per inch being the ratio for the nose and inner portions of the currently preferred embodiment. These ratios preferably apply to all parts of the threads which interfere, and where there is interference in other than the nose and inner portions, the amount in these two portions is preferably greater than that found elsewhere in the threads.

Preferably, the amount of interference should be sufficiently large and the gaps between the threads should be sufficiently small to produce a threaded connection that is highly resistant to leakage of liquids and/or gases in the inward and or outward direction(s). The performance of these joints at a given level of interference and the magnitude of the acceptable gap size are expected to increase as better thread compounds (sealant/lubricants) become available. However, considering the sealing capability of presently available thread compounds, also referred to as "dope," the radial gap 147 and the clearances 149 and 150 between the load and stab flanks should preferably be in the range of up to about 0.006 inches, more preferably up to about 0.005 inches and still more preferably up to about 0.004 inches. For the single-step, single-lead interference fit threads of FIGS. 12A–12C, a width in the range of about 0.004 inches and standard API thread compound is presently preferred.

Even though a connection may be of the correct geometry, it may still not properly function due to galling during power-tight makeup. Tapered interference single-lead thread is sensitive to galling. Moreover, this tendency is accentuated by the use of line pipe tubulars. Line pipe steels are generally fine-grained and use a steel that is low in carbon and sulphur, producing a difficult to machine and galling-prone material. Consequently, it is recommended that the male and/or female thread surfaces be subjected to anti-galling surface treatment. In addition, it is recommended that the surface treatment be such as to provide an anchor pattern for the thread compound.

In this connection, in accordance with the invention, the surfaces of the male thread are preferably roughened for promoting adherence of a layer of thread compound to said surfaces. The resultant roughened surfaces may for example comprise rugae formed by applying to the surfaces a coating comprising a phosphate of manganese or zinc. Alternatively, the surfaces may be roughened by a chemical etchant, for example oxalic acid. Moreover, and preferably, the roughened surfaces may comprise depressions or other surface irregularities formed by blasting the surfaces with particulate material.

According to another preferred embodiment of the invention, the female thread has in or on its surfaces one or more materials in solid form for enhancing the galling resistance of those surfaces. For example, such materials may include one or more metals from the group including manganese, zinc, copper, tin, nickel, silicon, chromium, silver, gold and other noble metals, or combinations of the foregoing. Such metals may for example be present in the form of one or more coatings composed of phosphates of metals from the group including manganese and zinc. As a further example, the metals may be present in the form of a electroplated layer of one or more metals from the group including nickel, zinc, tin and copper. According to still another example, the metals may include a layer of electroless nickel plate. Also, metals may be implanted in the thread surfaces, and the metals for enhancing galling resistance may therefore include an implant comprising silicon in the thread surfaces, such as may be deposited through application of Klaysol (tm) to the thread surfaces, or an ion implant using chromium, silver, gold, other noble metals or a combination thereof.

According to one embodiment of the invention, at least the male or female thread surface is roughened, such as by blasting, etching or a coating having surface roughness. For example, the male and/or female thread surfaces may have a roughness value (Ra) which may for example be in the range of about 64 to 125. But it is particularly preferred that both of the threads be treated to inhibit galling and/or promote adherence of thread compound. According to a particularly preferred embodiment, the surfaces of the male thread are roughened for promoting adherence of the thread compound, and the surfaces of the female thread include one or more implanted or coating materials in solid form for enhancing the galling resistance of said surfaces. According to what is currently considered best practice, the surfaces of the male thread have been roughened by blasting and the coating materials applied to the female thread include a phosphate of a metal from the group including manganese and zinc. This is illustrated by way of example in FIG. 13B.

Figure 13B:
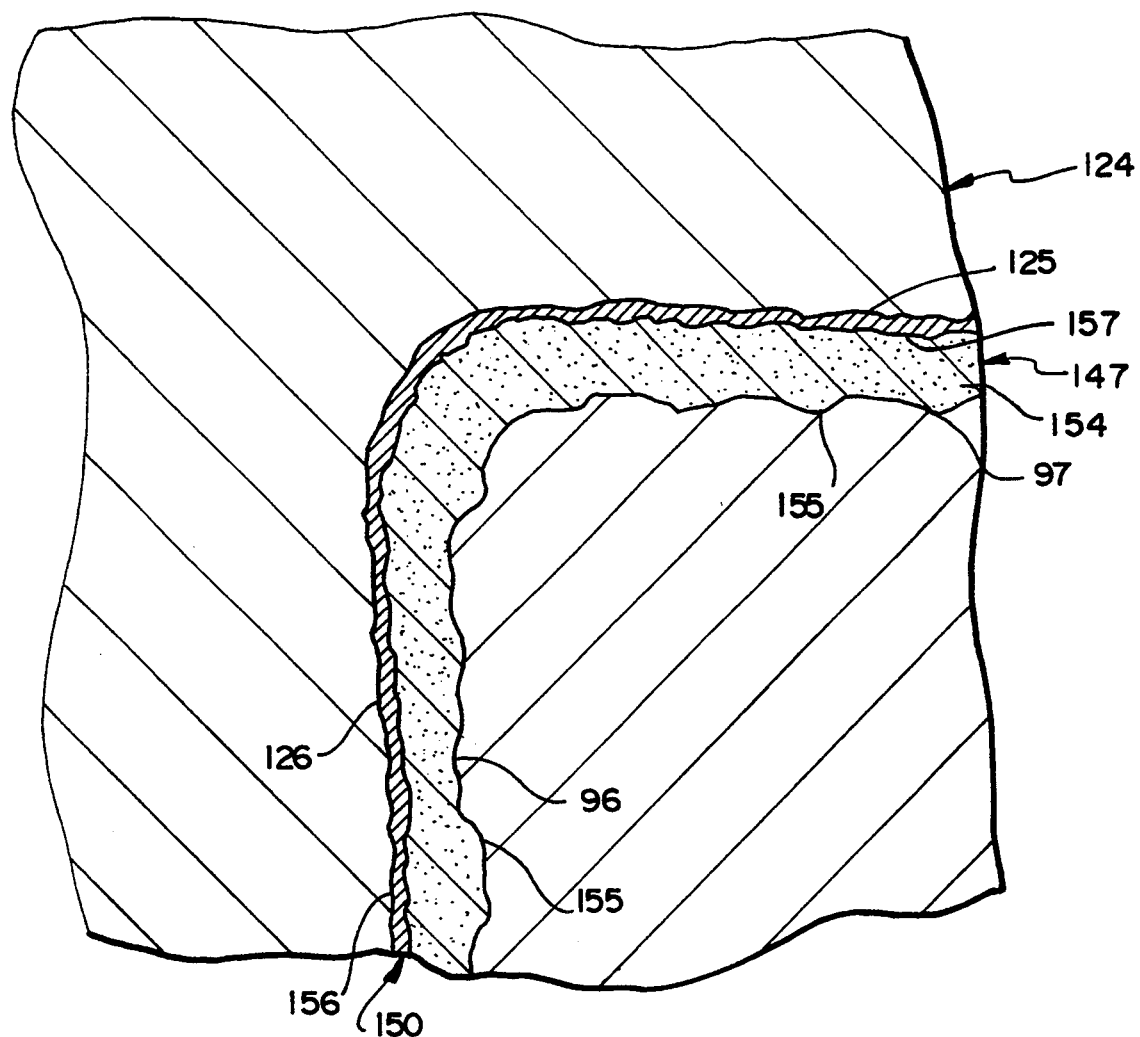
FIG. 13B is an enlarged version of FIG. 13A, showing surface treatment of the threads and thread compound in the gaps between the threads.

FIG. 13B is for the most part similar to FIG. 13A. Both figures show the same portions of load flanks 96 and 126 with load flank clearance 150, as well as the same portions of thread crest 97 and root 125 with radial clearance 147. Within these clearances is the thread compound 154 which acts as a sealant and lubricant. FIG. 13B differs from FIG. 13A in illustrating the surface treatments applied to the male and female thread surfaces in accordance with the above-mentioned particularly preferred embodiment. The male thread load flank, crest, stab flank and root have all been subjected to light blasting. As a result of this treatment, small irregular gouges have been formed in the surfaces of the male thread, root, crest and flanks as illustrated by the gouges 155 present in the surfaces of male thread load flank 96 and crest 97. FIG. 13B also illustrates application of a phosphate coating which has been applied to the root, crest and flanks of the female thread. This is shown by the phosphate coating 156 which may be seen on the female thread load flank 126 and root 125. Note that the nature of the phosphate coating is such that it includes surface roughness, as represented by the rugae 157 distributed throughout its surface.

In the made-up joint of FIG. 13B, the gouges 155 resulting from the light blasting treatment and the rugae 157 of the phosphate coating each tend to provide an anchor pattern for the thread compound 154, thus assisting in holding the compound in place when the made-up joint is subjected to fluid pressure at one of its ends, thus encouraging the compound to remain in place instead of extruding out of the opposite end of the thread. The combination of roughening of one or both threads and the damming effect illustrated in FIGS. 12A and 12C cooperate with the thread profile and interference between the threads in strongly discouraging or very effectively preventing such extrusion.

The threaded connections of the present invention are useful for example in pipe strings for all kinds of wells, including for example water, oil, gas, reactor, disposal and other types of wells. The threaded connections of this invention perform to particular advantage in those situations in which the tensile strength and/or compression resistance and/or internal pressure resistance and/or external pressure resistance of a connection should substantially correspond or be greater than that of the unthreaded portions of the walls of the pipe and/or the female member.

For example, it may be desired to conduct within a reactor well a chemical reaction involving high reaction pressures and environmentally destructive components or products. In these circumstances, it is of great importance that any threaded connections in the containment casing of the well should have a high resistance to leakage of liquid and/or gaseous fluids through the thread. The threaded connections of the present invention can readily be configured to provide such pressure resistance.

Moreover, in deep gas or oil wells the casing strings must be capable of high resistance to tensile or compressive loads, At present it is known to drill such wells to depths in excess of 20,000 with larger diameter pipe being required to depths in excess of 10,000 feet in which the total weight of the large diameter casing is on the order of 2.1 million pounds while the portion of that weight not supported by buoyancy and frictional engagement with the surrounding strata layers may be as large as 1.8 million pounds.

In the progress of the art up to this point, the typical choice of pipe and threaded connections for high performance applications has been that conforming to API Casing Standards. The present invention makes possible the attainment of improved performance by a different grade of pipe, such as API line pipe, with considerable savings in costs. In its most preferred form, the threaded connection of the present invention is capable of attaining tensile, compression and leak performance substantially as good as or better than that of the line pipe itself, which represents a substantial step forward in the art.

The foregoing is for example illustrated by FIG. 14 in which well 158 comprising bore 159 in earth 160 is lined with API line pipe grade casing 161 having its outer surface in contact with the surrounding strata 162. Supported within casing 161 is a string 163 of line pipe corresponding to API SPEC 5L, having a nominal diameter of 20 inches and extending from a position down hole 164 to the earth's surface 165. There, a platform 166, supporting structure 167, cable 168 and manipulating means 169 provide support for the pipe string. The string is formed from pipes 170 threaded at both ends in accordance with the pipe profile of FIG. 10 and the pipes are secured together by couplings 171 formed of coupling stock conforming to API SPEC 5CT and having the thread profile disclosed in FIG. 11.

The male and female threads have divergent taper as discussed above in connection with FIGS. 3–8, the amount of radial interference being about 0.002 inches per inch at the nose and inner portions of the male and female threads, gradually tapering to a radial interference of about 0.0008 inches per inch between the run out portion of the male thread and the corresponding female thread turns. Thus, there is an interference fit throughout substantially all of the engaged portions of the male and female threads, with the amount of interference being greatest at the nose portion of the male thread and being located at the minor diameter of the threaded connection. There is also load flank bearing and stab flank sealing as shown in FIGS. 12A–12C.

There is a gap at the major diameter of the connection, as described above, that is filled with thread compound. The width of this gap, the surface treatment of the threads and the remaining dimensions of the thread profiles are established in the manner described below to ensure retention of the thread compound within this gap.

Testing has shown that threaded connections can be made in accordance with the invention that have tensile strength, compression strength and internal pressure resistance substantially equal to or in excess of that of the wall of the pipe body. For purposes of such testing, pipes, couplings, threads and joints were prepared that generally conform to the following values, presently considered to represent the best embodiment of the invention for 20 inch OD, 0.635 inch wall X-56 line pipe coupled with couplings fabricated from standard API K-55 coupling stock:

| | PIN THREAD | COUPLING THREAD |
|---|---|---|
| LFH (load flank height) | .084 / .086 | .086 / .088 |
| HH (half height) | .0425 | .0425 |
| Theta (pitch angle) | 2.8624° REF. | |
| Gamma (pitch angle) | | 2.8624° REF. |
| TT (thread thickness) | .1667 / .1647 | .1656 / .1636 |
| TP (thread pitch) | .3333 | .3333 |
| GW (groove width) | .1666 / .1686 | .1677 / .1697 |
| SFA (stab flank angle) | 17.0° / 17.5° | 17.0° / 17.5° |
| LFA (load flank angle) | 5.0° / 5.5° | 5.0° / 5.5° |
| FHD (flank height difference) | .0167 REF. | .0167 REF. |
| SFH (stab flank height) | .1017 REF. | .1037 REF. |
| 103 (radiuses) | .008 / .010 R. TYP. | |
| 129 (fillets) | | .006 / .008 R. TYP. |
| 104 (fillets) | .006 / .008 R. TYP. | |
| 128 (radiuses) | | .008 / .010 R. TYP. |
| GAUGING POSITION | 0.7 IN. FROM END OF PIN | 5.2 IN. FROM FACE OF COUPLING |
| $D_4$* | 20.050 | |
| g* | 1.700 | |
| $A_1$* | 5.900 +.010 −.000 | |
| $L_4$* | 5.300 | |
| $L_7$* | 3.600 | |
| $L_c$* | 2.933 MIN. | |
| PITCH DIA. | 19.675 +.002 −.003 | 19.640 +.003 −.002 |
| COUPLING ID BORE | | 19.483 |
| DIAMETER AT GAUGING POSITION | 19.7742 +.002 | 19.5404 +.003 −.002 |
| T.P.I. | 3 | 3 |
| TAPER ON DIAMETER | 0.1000 IN./IN. | 0.1020 IN./IN. |
| MIN. TAPER | 0.0985 IN./IN. | 0.1010 IN./IN. |
| MAX. TAPER | 0.1010 IN./IN | 0.1035 IN./IN. |
| FULL DEPTH THREADS | FULL RUN-OUT | 5.750 MIN |
| TURN PIPE O.D. | 20.050 +.010 −.000 | NOT APPLICABLE |
| TURN COUPLING O.D. TO CLEANUP | NOT APPLICABLE | 21.000 NOMINAL 20.900 MIN 21.100 MAX MAX 250 (Ra) MICRO-FINISH |
| COUPLING COUNTER-BORE | NOT APPLICABLE | 20.265 DIA × 0.100 |
| COUPLING LENGTH | NOT APPLICABLE | 12.800 +.2 −.0 |

*Defined in accordance with the corresponding designators in API Specification STD 5B, 13th Edition, 5/31/88, p. 10.

The pipes were made in sets comprising minimum, maximum and nominal dimensions, and were provided with standard triangle markings to show nominal make-up position. To provide assistance in retaining the sealant-/lubricant and resisting galling, the male threads were blasted, prior to assembly, with medium to fine grit, e.g. Reed Mineral Black Grit X/fine BG No. 6, to produce minute depressions in its surface and conform it to the National Association of Corrosion Engineers (Houston, Tex., U.S.A.) White Metal Standard No. 1 (for blasting of metal for application of coatings), published as part of NACE Standard TM0170-70, Item No. 53005, Approved November 1970, Reprinted November 1986, at page 2, Section 5: Surface Conditions of the Visual Standards and 5.1.1 NACE No. 1: White Metal Blast Cleaned Surface Finish. The coupling threads were coated with zinc phosphate to provide galling protection and surface roughness.

Specimens were then assembled at minimum-minimum, maximum-maximum and nominal-nominal tolerance specifications with various thread compounds, such as standard API thread compound conforming to the requirements of API Bulletin 5A2 on thread compounds, and non-API compounds such as Teflon (TM)-based Liquid O-Ring (TM) #104 thread compound. Each combination was made and broken out to check make-up torque and galling. Joints were deemed acceptable if the parts made up with maximum torque of 28,300 foot-pounds within 0.20 inches short of the base of the reference triangle, or made up with minimum torque of 18,300 foot-pounds and no more than 0.1 inches of the apex of the reference triangle showing. No galling was observed on specimens made-up with standard API or Teflon (TM) based thread compound and only minor galling was observed on specimens made up with anaerobic sealant.

Specimens were then re-assembled for physical testing at the most disadvantageous combination of dimensions and make-up torque. The physical tests included hydrostatic closed end internal pressure, pure axial loading and combined pressure and axial loading. A combined axial loading and internal gas pressure test was also performed. Load capacities of the test specimens were calculated according to the principles described in API Bulletin 5C3, Bulletin on Formulas and Calculations for Casing, Tubing, Drill Pipe and Line Pipe Properties, which was in its 4th Edition, dated Feb. 1, 1985, amended by Supplement 1 of Jul. 31, 1986.

No leakage occurred in the connections at any internal pressure or at any internal pressure with axial tension load. Minor leakage occurred at extreme high compression loads with internal pressure. Leaking ceased upon reduction of the axial compression load. Subsequent performance at tension was not adversely affected.

Subsequent to completion of all test cycles, attempts were made to destructively fail the specimens. The hydrostatic closed end pressure test resulted in attainment of the API Minimum Internal Yield pressure rating of 3112 psi. A pressure of 5460 psi was reached before the on-set of gross plastic deformation of the pipe body with rupture of the pipe body occurring at 5330 psi. No leakage was observed at any time and no portion of the failure was in the threaded connection nor was it damaged in any way. Attempts to destructively test the combined load specimen were not successful due to the load capacity limitation of the testing machine. Beside the internal minimum yield pressure rating of 3112 psi, the combined load test specimen exhibited a calculated axial load capacity of 2,163,400 pounds. This test specimen was actually subjected to an internal pressure of 3860 psi and a total tension load of 3,470,000 pounds producing gross plastic deformation of the pipe body in excess of two percent strain but no leakage in the connection. The test operator declined to subject the specimen or the machine to further pressure.

A particularly preferred embodiment of the invention has been illustrated with specific dimensions and other properties described above. It will be understood by those skilled in the art that the foregoing dimensions and properties are offered only by way of illustration and to disclose what is currently regarded as the best mode of practicing the invention. Such persons will readily understand that the foregoing parameters may be further refined and optimized, and that pipes with male thread and female members having a wide variety of differing properties and parameters can be fabricated which fall within the scope of the present invention. Accordingly, the scope of the invention is not to be limited by the foregoing embodiments but rather is to be construed to encompass all variations which fall within the scope of the accompanying claims and equivalents thereof.

I claim:

1. In combination, a length of threaded pipe comprising a pipe body, a male thread with a run-out portion and regular turns having load flank, stab flank, crest and root, and a female member with female thread to enable coupling of said pipe to a further length of said threaded pipe to form a threaded connection, said combination comprising:
   A. said male thread being tapered over at least a portion of its axial length, including a nose portion thereof,
   B. said female thread being tapered over at least a portion of its axial length, including an inner portion thereof which threadably engages with said nose portion when said threads are in made-up position,
   C. said male and female threads having load flank angles and thread heights sufficient to ensure that with the threads in made-up position in the threaded connection, at least the load flank of the male thread of said connection will remain engaged with the load flank of the female thread of said connection, even in response to an axial load on said connection substantially corresponding to the axial yield strength of the pipe body;
   D. said male and female threads being so dimensioned in relation to each other at said nose and inner portions to ensure that in made-up position in said connection a root-to-crest and/or flank-to-flank interference fit will exist between said nose and inner portions, said interference being sufficiently large for forming in the threads, with the aid of thread compound present in gaps which may optionally exist between said male and female threads, a seal that substantially prevents leakage of fluid through the threads
      1. when the connection is subjected to internal fluid pressure corresponding to the internal pressure rating of the pipe body; or
      2. when the connection is subjected to external fluid pressure corresponding to the external pressure rating of the pipe body; and
   E. said male and female threads being so dimensioned in relation to each other that in made-up position in said connection the run-out portion of the male thread will engage a corresponding portion of the female thread in an interference fit, said interference being sufficient to retain threaded engagement between said run-out and corresponding portions
      1. when the connection is subjected to axial tension corresponding to the axial yield strength of the pipe body and to internal fluid pressure corresponding to the internal pressure rating of the pipe body, or
      2. when the connection is subjected to axial tension corresponding to the axial yield strength of the pipe body and to external fluid pressure corresponding to the external pressure rating of the pipe body,
   and said interference being less than that which will cause either substantial destructive hoop stress yield deformation of said pipe or female member or substantial destructive galling of said male or female threads.

2. Apparatus according to claim 1 wherein the interference between said nose and inner portions is sufficiently large for substantially preventing leakage of fluid through the threads when the connection is subjected to internal fluid pressure corresponding to the internal pressure rating of the pipe body.

3. Apparatus according to claim 1 wherein the interference between said nose and inner portions is sufficiently large for substantially preventing leakage of fluid through the threads when the connection is subjected to external fluid pressure corresponding to the external pressure rating of the pipe body.

4. Apparatus according to claim 1 wherein the interference between said nose and inner portions is sufficiently large for substantially preventing leakage of fluid through the threads
   A. when the connection is subjected to internal fluid pressure corresponding to the internal pressure rating of the pipe body, and
   B. when the connection is subjected to external fluid pressure corresponding to the external pressure rating of the pipe body.

5. Apparatus according to claim 1 wherein the interference between the run-out portion of the male thread and the corresponding portion of the female thread is sufficient to retain threaded engagement between said run-out and corresponding portions when the connection is subjected to axial tension corresponding to the axial yield strength of the pipe body and to internal fluid pressure corresponding to the internal pressure rating of the pipe body.

6. Apparatus according to claim 1 wherein the interference between the run-out portion of the male thread and the corresponding portion of the female thread is sufficient to retain threaded engagement between said run-out and corresponding portions when the connection is subjected to axial tension corresponding to the axial yield strength of the pipe body and to external fluid pressure corresponding to the external pressure rating of the pipe body.

7. Apparatus according to claim 1 wherein the interference between the run-out portion of the male thread and the corresponding portion of the female thread is sufficient to retain threaded engagement between said run-out and corresponding portions
   A. when the connection is subjected to axial tension corresponding to the axial yield strength of the pipe body and to internal fluid pressure corresponding to the internal pressure rating of the pipe body, and
   B. when the connection is subjected to axial tension corresponding to the axial yield strength of the pipe body and to external fluid pressure corresponding to the external pressure rating of the pipe body.

8. Apparatus according to claim 1 wherein
   A. the interference between said nose and inner portions is sufficiently large for substantially preventing leakage of fluid through the threads when the connection is subjected to internal fluid pressure corresponding to the internal pressure rating of the pipe body, and
   B. the interference between the run-out portion of the male thread and the corresponding portion of the female thread is sufficient to retain threaded engagement between said run-out and corresponding portions when the connection is subjected to axial tension corresponding to the axial yield strength of the pipe body and to internal fluid pressure corresponding to the internal pressure rating of the pipe body.

9. Apparatus according to claim 1 wherein
   A. the interference between said nose and inner portions is sufficiently large for substantially preventing leakage of fluid through the threads when the connection is subjected to internal fluid pressure corresponding to the internal pressure rating of the pipe body, and
   B. the interference between the run-out portion of the male thread and the corresponding portion of the female thread is sufficient to retain threaded engagement between said run-out and corresponding portions when the connection is subjected to axial tension corresponding to the axial yield strength of the pipe body and to external fluid pressure corresponding to the external pressure rating of the pipe body.

10. Apparatus according to claim 1 wherein
    A. the interference between said nose and inner portions is sufficiently large for substantially preventing leakage of fluid through the threads when the connection is subjected to external fluid pressure corresponding to the external pressure rating of the pipe body, and
    B. the interference between the run-out portion of the male thread and the corresponding portion of the female thread is sufficient to retain threaded engagement between said run-out and corresponding portions when the connection is subjected to axial tension corresponding to the axial yield strength of the pipe body and to internal fluid pressure corresponding to the internal pressure rating of the pipe body.

11. Apparatus according to claim 1 wherein
    A. the interference between said nose and inner portions is sufficiently large for substantially preventing leakage of fluid through the threads when the connection is subjected to external fluid pressure corresponding to the external pressure rating of the pipe body, and
    B. the interference between the run-out portion of the male thread and the corresponding portion of the female thread is sufficient to retain threaded engagement between said run-out and corresponding portions when the connection is subjected to axial tension corresponding to the axial yield strength of the pipe body and to external fluid pressure corresponding to the external pressure rating of the pipe body.

12. Apparatus according to claim 1 wherein
    A. the interference between said nose and inner portions is sufficiently large for substantially preventing leakage of fluid through the threads
       1. when the connection is subjected to internal fluid pressure corresponding to the internal pressure rating of the pipe body, and
       2. when the connection is subjected to external fluid pressure corresponding to the external pressure rating of the pipe body, and
    B. the interference between the run-out portion of the male thread and the corresponding portion of the female thread is sufficient to retain threaded engagement between said run-out and corresponding portions
       1. when the connection is subjected to axial tension corresponding to the axial yield strength of the pipe body and to internal fluid pressure corresponding to the internal pressure rating of the pipe body, and
       2. when the connection is subjected to axial tension corresponding to the axial yield strength of the pipe body and to external fluid pressure corresponding to the external pressure rating of the pipe body.

13. Apparatus according to claim 12 wherein said male thread is formed adjacent at least one end of said pipe and said male thread and female thread are so dimensioned in relation to each other, in both thread profile and diameter,
    A. to provide between them flank to flank gaps and a root to crest gap at the major diameter of the threads and
    B. to ensure that a root to crest interference fit will exist between them in made-up position at the minor diameter of the threads,
    C. said interference being sufficiently large and said gaps being sufficiently small, at the nose portion of said male thread,
       1. to provide said seal, and
       2. to cause the interference between the threads to gradually decrease along the axial length of the threads in a direction away from said at least one end.

14. Apparatus according to claim 1 wherein

A. said male thread is a single step, single lead thread of substantially constant lead of at least about 0.2 inch having a substantially uniform single taper formed about a central axis with substantial portions of the axial length of its root and crest being rectilinear and parallel to said axis, said male thread being formed adjacent at least one end of said pipe and including a nose portion composed of up to about half of said regular thread turns nearest said at least one end, and B. said female thread is a single step, single lead thread of substantially constant lead of at least about 0.2 inch having a substantially uniform single taper formed about a central axis with substantial portions of the axial length of its root and crest being rectilinear and parallel to said axis, and including an inner portion composed of female thread turns which threadably engage with the nose portion of the male thread when said threads are in made-up position.

15. Apparatus according to claim 1, 12 or 14 wherein said male thread and female thread are dimensioned in relation to each other, in both thread profile and diameter, to provide a root to crest or flank to flank gap between them and to ensure that a root to crest or flank to flank interference fit will exist between them in said connection.

16. Apparatus according to claim 14 wherein said male thread is formed adjacent at least one end of said pipe and said male thread and female thread are so dimensioned in relation to each other, in both thread profile and diameter, A. to provide between them flank to flank gaps and a root to crest gap at the major diameter of the threads and B. to ensure that a root to crest interference fit will exist between them in made-up position at the minor diameter of the threads, C. said interference being sufficiently large and said gaps being sufficiently small, at the nose portion of said male thread, 1. to provide said seal, and
2. to cause the interference between the threads to gradually decrease along the axial length of the threads in a direction away from said at least one end.

20. Apparatus according to claim 1, 12, 13, 16, 17, 18, or 19 wherein

A. said male thread has a hook profile and is tapered over at least a nose portion of its axial length, B. said female thread has a hook profile which is matingly compatible with the male thread profile and is tapered over an inner portion of its axial length which will threadably engage with the nose portion of said male thread in made up position in said connection, C. at least one of said threads has its surface roughened in an irregular manner to assist in retention of a thread compound in place at the surface thereof, and D. said male and female threads are so dimensioned in relation to each other 1. to provide a root to crest or flank to flank gap between them and
2. to ensure that a root to crest or flank to flank interference fit will exist between them in made up position, 3. said interference being sufficiently large and said gap being sufficiently small to substantially prevent, with the aid of thread compound therein and without substantial destructive galling of the threads, leakage through the nose and inner portions thereof when the connection is subjected to said fluid pressure and to axial tension corresponding to the axial yield strength of the pipe body.

17. Apparatus according to claim 1 wherein said male thread and female thread are so dimensioned in relation to each other, in both thread profile and diameter, to provide between them flank to flank gaps and a root to crest gap at the major diameter of the threads and to ensure that a root to crest interference fit will exist between them in made-up position at the minor diameter of the threads.

18. Apparatus according to claim 1 wherein said male thread is formed adjacent at least one end of said pipe and said male thread and female thread are so dimensioned in relation to each other, to cause the interference between them to gradually decrease along the axial length of the threads in a direction away from said at least one end.

19. Apparatus according to claim 1 wherein said male thread is formed adjacent at least one end of said pipe and said male thread and female thread are so dimensioned in relation to each other, in both thread profile and diameter, A. to provide between them flank to flank gaps and a root to crest gap at the major diameter of the threads and B. to ensure that a root to crest interference fit will exist between them in made-up position at the minor diameter of the threads, C. said interference being sufficiently large and said gaps being sufficiently small, at the nose portion of said male thread, 1. to provide said seal, and
2. to cause the interference between the threads to gradually decrease along the axial length of the threads in a direction away from said at least one end.

21. Apparatus according to claim 1, 14 or 19 wherein at least one of said threads has its surface roughened in an irregular manner to assist in retention of a thread compound in place at the surface thereof.

22. In combination, a length of threaded pipe comprising a pipe body with male thread turns having load flanks, stab flanks, crests and roots and a female threaded member for coupling of said pipe to a further length of threaded pipe to form a threaded connection, said combination comprising:

A. said male thread having a hook profile and being tapered over at least a nose portion of its axial length, B. said female thread having a hook profile matingly compatible with the male thread profile and being tapered over an inner portion of its axial length which will threadably engage with the nose portion of said male thread in made up position, C. at least one of said threads having its surface roughened in an irregular manner to assist in retention of a thread compound in place at the surface thereof, and D. said male and female threads being so dimensioned in relation to each other 1. to provide a root to crest or flank to flank gap between them and
2. to ensure that a root to crest or flank to flank interference fit will exist between them in made up position,
3. said interference being sufficiently large and said gap being sufficiently small to substantially prevent, with the aid of thread compound therein and without substantial destructive galling of the threads, leakage through the nose and inner portions thereof
   a. when the connection is subjected to internal fluid pressure corresponding to the internal pressure rating of the pipe body and to axial tension corresponding to the axial yield strength of the pipe body, or
   b. when the connection is subjected to external fluid pressure corresponding to the external pressure rating of the pipe body and to axial tension corresponding to the axial yield strength of the pipe body.

23. Apparatus according to claim 1, 14, 19 or 22 in which the male and female threads are substantially uniformly tapered at least in the nose and inner portions thereof.

24. Apparatus according to claim 1, 14, 19 or 22 in which the male and female threads are substantially uniformly tapered over at least a major portion of their respective axial lengths to form included first and second apex angles of taper.

25. Apparatus according to claim 1, 14, 19 or 22 in which the male and female threads are each substantially uniformly tapered substantially throughout at least the mutually engaging portions of their respective axial lengths to form included first and second apex angles of taper.

26. Apparatus according to claim 1, 14, 19 or 22 in which the male and female threads, in made-up position, have radial root to crest interference substantially throughout at least about half of the axial length of their mutually engaging portions.

27. Apparatus according to claim 1, 14, 19 or 22 in which the male and female threads, in made-up position, have radial root to crest interference substantially throughout the axial length of their mutually engaging portions.

28. Apparatus according to claim 1, 14, 19 or 22 in which the male and female threads, as viewed in longitudinal cross-section, have negatively inclined load flanks and positively inclined stab flanks.

29. Apparatus according to claim 1, 14, 19 or 22 in which the male and female threads have crests and roots, as viewed in longitudinal cross-section, that include rectilinear bearing surfaces of substantial length in the axial direction.

30. Apparatus according to claim 29 in which the male and female threads, as viewed in longitudinal cross-section, have negatively inclined load flanks and positively inclined stab flanks.

31. Apparatus according to claim 29 in which the male thread has major and minor diameters with which the male thread crest and root respectively coincide, and root to crest interference is provided at at least one of said diameters.

32. Apparatus according to claim 29 in which the male thread has major and minor diameters with which the male thread crest and root respectively coincide, and root to crest interference is provided at the minor diameter.

33. Apparatus according to claim 32 in which there is a small clearance between the male thread crest and the female thread root at the major diameter.

34. Apparatus according to claim 1, 14, 19 or 22 in wherein the male thread has a run-out portion that includes run-out thread turns.

35. Apparatus according to claim 34 wherein at least a portion of the run-out thread turns have a crest which has been machined to a common diameter with an adjacent unthreaded portion of the pipe wall, which unthreaded portion is of reduced diameter relative to portions of the pipe wall not so machined.

36. Apparatus according to claim 34 wherein the female member includes wall means and the run-out thread turns are present in a longitudinal distance interval of the pipe wall which is of restricted length, for retaining such thread turns substantially completely within the wall means when the threads are in made-up position.

37. Apparatus according to claim 34 wherein female thread turns have their crests bottomed in the root of substantially all of the male run-out thread turns, when the threads are in made-up position.

38. Apparatus according to claim 34 wherein the female member includes wall means, at least a portion of the run-out thread turns have crests which have been machined to a common diameter with an adjacent unthreaded portion of the pipe wall, which unthreaded portion is of reduced diameter relative to portions of the pipe wall not so machined, the longitudinal distance interval within which the run-out thread turns are present in the pipe wall is restricted for retaining such thread turns substantially completely within the wall means of the female member when the threads are in made-up position, and the female thread is positioned for causing substantially all of the run-out thread turns to be threadedly engaged by female thread turns which have their crest bottomed in the root of the run-out thread turns with the threads in made-up position.

39. Apparatus according to claim 1, 14, 19 or 22 wherein the female member includes wall means having an unthreaded cylindrical inner surface adjacent an open end of the female member.

40. Apparatus according to claim 39 wherein the male thread turns present on the pipe include both regular thread turns and run-out thread turns, and the female member has wall means including at least one female thread turn adjacent said inner surface, which thread turn will not threadedly engage any of said run-out thread turns when the threads are in made-up position.

41. Apparatus according to claim 40 wherein at least a portion of the run-out thread turns have a crest which has been machined to a common diameter with an adjacent unthreaded portion of the pipe wall which is of reduced diameter relative to portions of the pipe wall not so machined, and the female thread turns which will not threadedly engage the run-out thread turns will be closely adjacent or in abutting relationship to said pipe wall portion of reduced diameter, when the threads are in made-up position.

42. Apparatus according to claim 1, 14, 19 or 22 wherein the female member has wall means with an open end, the male and female threads are tapered along their axial lengths to form first and second apex angles of taper respectively, said second angle being greater than the first, and the difference between said first and second apex angles is an amount in the range of about 0.01 to about 1 degrees which is sufficient for producing in the wall means at its open end a hoop stress that is lower than the hoop stress in the region of the wall means surrounding the inner portion of the female thread.

43. Apparatus according to claim 42 wherein the difference between said angles is in the range of about 0.05 to about 0.7 degrees.

44. Apparatus according to claim 42 wherein the difference between said angles is in the range of about 0.1 to about 0.4 degrees.

45. Apparatus according to claim 1, 14, 19 or 22 wherein the female member has wall means with an open end, the male thread turns present in the pipe wall include both regular thread turns and run-out thread turns, at least a portion of the run-out thread turns have a crest which has been machined to a common diameter with an adjacent unthreaded portion of the pipe wall which is of reduced diameter relative to portions of the pipe wall not so machined, the male and female threads are tapered along their axial lengths to form first and second apex angles of taper respectively, said second angle being greater than the first, and the difference between said first and second apex angles is an amount in the range of about 0.01 to about 1 degrees which is sufficient for producing in the wall means at its open end a hoop stress that is lower than the hoop stress in the region of the wall means surrounding the inner portion of the female thread.

46. Apparatus according to claim 1, 14, 19 or 22 wherein the pipe conforms substantially to the strength requirements of API Line Pipe Specification 5L, as amended on May 31, 1988.

47. Apparatus according to claim 1, 14, 19 or 22 wherein the pipe has said male thread formed in a first end thereof, the female member has wall means which is an integral portion of a second end of the pipe wall and the female thread is formed in a portion said second end.

48. Apparatus according to claim 1, 14, 19 or 22 wherein said male threads are present at both a first and a second end of the pipe wall, and the female member is a coupling that is not an integral portion of the pipe wall and has two open ends and two sets of said female threads therein.

49. Apparatus according to claim 48 wherein the coupling is formed of material that conforms substantially to the strength requirements of section 8 of API Coupling Stock Standard 5CT, as amended on Mar. 15, 1988.

50. Apparatus according to claim 1, 14, 19 or 22 wherein the pipe and/or female member have a thread or threads formed of
A. steel that contains one or more grain refiners in amounts sufficient to provide the steel with a microstructure substantially finer than that of API Casing, or
B. metal characterized by carbon and sulfur contents substantially below those of API Casing and having a substantial tendency to gall destructively when fully made up in a leak-resistant, interference fit threaded joint, or
C. non-ferrous metal having a substantial tendency to gall destructively when fully made up in a leak-resistant, interference fit threaded joint, or
D. a combination of the foregoing.

51. Apparatus according to claim 1, 14, 19 or 22 wherein the pipe and/or female member have at least one thread formed of an alloy composed substantially of at least one metal selected from among nickel, titanium and aluminum.

52. Apparatus according to claim 1, 14, 19 or 22 wherein the pipe and/or female member have walls and threads formed at least in part of polymeric material.

53. Apparatus according to claim 52 wherein the polymeric material includes material selected from among epoxy, polyester, polyether, acetal and polyphenylene sulfide polymers.

54. Apparatus according to claim 52 wherein the polymeric material is reinforced with fiber.

55. Apparatus according to claim 1, 14, 19 or 22 wherein at least the male thread has its surface roughened in an irregular manner to promote adherence of a layer of thread compound to said surfaces.

56. Apparatus according to claim 1, 14, 19 or 22 wherein at least one of said threads has its surface roughened in an irregular manner to assist in retention of a thread compound in place at the surface thereof and the roughened surface comprises rugae formed by applying to the surface a coating comprising at least one phosphate selected from among manganese phosphate and zinc phosphate.

57. Apparatus according to claim 1, 14, 19 or 22 wherein at least one of said threads has its surface roughened in an irregular manner to assist in retention of a thread compound in place at the surface thereof and the roughened surface comprises roughness formed by an etchant.

58. Apparatus according to claim 1, 14, 19 or 22 wherein at least one of said threads has its surface roughened in an irregular manner to assist in retention of a thread compound in place at the surface thereof and the roughened surface comprises surface irregularities formed by blasting the surfaces with particulate material.

59. Apparatus according to claim 58 wherein the amount of blasting with particulate material is sufficient to conform said surfaces to the National Association of Corrosion Engineers (Houston, Tex., U.S.A.) Standard TM 0170-70, white metal visual standard NACE No. 1.

60. Apparatus according to claim 1, 14, 19 or 22 having in or on the surfaces of the female thread at least one material in solid form for enhancing the galling resistance of said surfaces.

61. Apparatus according to claim 60 wherein said materials include at least one metal from the group including zinc, manganese, copper, tin, nickel and silicon.

62. Apparatus according to claim 60 wherein said materials include at least one phosphate selected from among manganese phosphate and zinc phosphate.

63. Apparatus according to claim 60 wherein said materials include an electroplated layer of at least one metal from the group including nickel, zinc, tin and copper.

64. Apparatus according to claim 60 wherein said materials include a layer of electroless nickel plate.

65. Apparatus according to claim 60 wherein said material includes an implant comprising at least one metal from the group including silicon, chromium, and the noble metals in said thread surfaces.

66. Apparatus according to claim 1, 14, 19 or 22 wherein the surface of the male thread has been roughened in an irregular manner for promoting adherence of a layer of thread compound to said surface and the surface of the female thread includes at least one implanted or coating material in solid form for enhancing the galling resistance of said surface.

67. Apparatus according to claim 66 wherein the surface of the male thread has been roughened by blasting or etching and said implanted or coating material includes at least one phosphate selected from among manganese phosphate and zinc phosphate at the surface of the female thread.

68. Apparatus according to claim 1, 14, 19 or 22 wherein the interference fit in at least the nose and inner portions is characterized by the male and female threads having predetermined bearing diameters, and by the male thread having a bearing diameter, in an unstressed condition, which exceeds the bearing diameter of the female thread, in an unstressed condition, by a ratio in the range of about 0.0005 to about 0.005 inches of such excess per inch of said female thread bearing diameter.

69. Apparatus according to claim 68 wherein the pipe and female member threads are of metallic material and said ratio is in the range of about 0.001 to about 0.005 inches per inch.

70. Apparatus according to claim 68 wherein said ratio is in the range of about 0.0015 to about 0.0025 inches per inch.

71. Apparatus according to claim 68 wherein the interference is sufficient to impart substantial leak resistance to the threaded connection when thread compound is present in the clearance.

72. Apparatus according to claim 68 in which the male thread has major and minor diameters with which the male thread crest and root respectively coincide, and root to crest interference is provided between the male and female threads at the minor diameter.

73. Apparatus according to claim 72 in which there is a small clearance between the male thread crest and the female thread root at the major diameter.

74. Apparatus according to claim 1, 14, 19 or 22 wherein the diameter of the pipe is at least about 12 inches.

75. Apparatus according to claim 1, 14, 19 or 22 wherein the diameter of the pipe is in the range of about 12 to about 60 inches.

76. Apparatus according to claim 1, 14, 19 or 22 wherein the diameter of the pipe is in the range of about 12 to about 30 inches.

77. Apparatus according to claim 1, 14, 19 or 22 wherein the diameter of the pipe is in the range of about 13 and ⅜ to about 20 inches in diameter, with wall thickness in the range of about 0.4 to 0.8 inches.

* * * * *

UNITED STATES PATENT AND TRADEMARK OFFICE
CERTIFICATE OF CORRECTION

PATENT NO. : 5,360,239
DATED : Nov. 1, 1994
INVENTOR(S) : Erich F. Klementich

It is certified that error appears in the above-indentified patent and that said Letters Patent is hereby corrected as shown below:

Column 23, line 16, change "remaining" to --retaining--.

Column 25, line 52, change "thee" to --the--.

Column 34, line 14, after "20,000" insert --feet--.

Column 36, line 26, delete "White Metal Standard" and substitute --white metal visual standard NACE--.

Column 37, lines 7-8, delete "rating".

Column 41, line 48, through column 42, line 9, move claim 20 to its correct position following claim 19; in line 1 of claim 20, after "13," insert --14,--.

Column 44, line 6, delete "in".

Signed and Sealed this

Ninth Day of May, 1995

Attest:

BRUCE LEHMAN

*Attesting Officer*       *Commissioner of Patents and Trademarks*